(12) United States Patent
Bhardwaj et al.

(10) Patent No.: US 10,986,496 B2
(45) Date of Patent: Apr. 20, 2021

(54) METHODS AND SYSTEMS FOR PROVIDING SECURE MOBILE EDGE COMPUTING ECOSYSTEMS

(71) Applicant: Georgia Tech Research Corporation, Atlanta, GA (US)

(72) Inventors: Ketan Bhardwaj, Atlanta, GA (US); Ada Gavrilovska, Atlanta, GA (US); Taesoo Kim, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 311 days.

(21) Appl. No.: 16/322,421

(22) PCT Filed: Aug. 1, 2017

(86) PCT No.: PCT/US2017/044944
§ 371 (c)(1),
(2) Date: Jan. 31, 2019

(87) PCT Pub. No.: WO2018/026841
PCT Pub. Date: Feb. 8, 2018

(65) Prior Publication Data
US 2019/0199695 A1    Jun. 27, 2019

Related U.S. Application Data

(60) Provisional application No. 62/369,422, filed on Aug. 1, 2016.

(51) Int. Cl.
*H04W 12/03* (2021.01)
*G06F 21/44* (2013.01)
(Continued)

(52) U.S. Cl.
CPC ............ *H04W 12/03* (2021.01); *G06F 15/16* (2013.01); *G06F 21/44* (2013.01); *G06F 21/57* (2013.01);
(Continued)

(58) Field of Classification Search
CPC .. H04W 12/108; G06F 21/602; H04L 9/3218; H04L 63/0428
(Continued)

(56) References Cited

U.S. PATENT DOCUMENTS 7,206,397 B1 * 4/2007 Kalmanek, Jr. ......... H04L 29/06
379/219
9,973,534 B2 * 5/2018 Mahaffey .............. H04L 63/105
(Continued)

OTHER PUBLICATIONS

Wang et al., "Method to Implement Hash-Linking Based Content Integrity Service", doi: 10.1109/WGEC.2008.81, 2008, pp. 24-27. (Year: 2008).*
(Continued)

*Primary Examiner* — Peter C Shaw
(74) *Attorney, Agent, or Firm* — Troutman Pepper Hamilton Sanders LLP; Ryan A. Schneider

(57) ABSTRACT

The disclosed technology may include systems and methods that provide a secure mobile edge computing eco-system employing end-to-end encrypted communication and edge functions capable of withstanding compromised operating systems. A secure mobile edge computing eco-system may include a use, an edge, and a backend. The backend may upload functionality to the backend onto secure edge functions (EFs). The functionality may be used to respond to user request at the edge in order to reduce bandwidth requirements and latency effects on a system. The secure edge functions (EFs) employing trusted execution environments (TEEs) to provide for secure execution and storage of functionality uploaded by the backend. The secure mobile
(Continued)

edge computing eco-system may also include secure protocol extensions (SPX) for ensuring end-to-end encryption of user requests from the user to the backend and through the edge.

21 Claims, 26 Drawing Sheets

(51) Int. Cl.
| | |
|---|---|
| H04W 12/08 | (2021.01) |
| G06F 21/74 | (2013.01) |
| G06F 15/16 | (2006.01) |
| G06F 21/57 | (2013.01) |
| H04W 12/10 | (2021.01) |
| H04W 12/108 | (2021.01) |
| G06F 21/60 | (2013.01) |
| H04L 9/32 | (2006.01) |
| H04L 29/06 | (2006.01) |

(52) U.S. Cl.
CPC ............ *G06F 21/602* (2013.01); *G06F 21/74* (2013.01); *H04L 9/3218* (2013.01); *H04L 63/0428* (2013.01); *H04W 12/08* (2013.01); *H04W 12/10* (2013.01); *H04W 12/108* (2021.01)

(58) Field of Classification Search
USPC ........................................................ 713/155
See application file for complete search history.

(56) References Cited

U.S. PATENT DOCUMENTS

| | | | |
|---|---|---|---|
| 2007/0043730 A1* | 2/2007 | Wisely | ................... G06Q 30/06 |
| 2012/0284778 A1* | 11/2012 | Chiou | ..................... G06F 21/41 |
| | | | 726/4 |
| 2016/0092696 A1* | 3/2016 | Guglani | ................ G06F 21/335 |
| | | | 726/26 |

OTHER PUBLICATIONS

Miyanaga et al., "Accelerating Integrity Verification on Secure Processors by Promissory Hash", IEEE, doi: 10.1109/PRDC.2017.13, 2017, pp. 20-29. (Year: 2017).*

International Search Report and Written Opinion from PCT Application No. PCT/US17/44944 dated Oct. 6, 2017 (15 pages).

* cited by examiner

METHODS AND SYSTEMS FOR PROVIDING SECURE MOBILE EDGE COMPUTING ECOSYSTEMS

CROSS-REFERENCE TO RELATED APPLICATIONS

This application claims priority to, and the benefit under 35 U.S.C. § 119(e), of U.S. Provisional Patent Application No. 62/369,422, filed 1 Aug. 2016, the entire contents and substance of which are hereby incorporated by reference as if fully set forth below.

BACKGROUND

The context aware, on-demand and distributed nature of next generation applications designed for mobile-cloud and internet of things (IOT) and other 5G technologies, puts high pressure on devices and infrastructure due to the sheer amount of generated traffic while simultaneously requiring even lower-response latencies for their interactive nature. Users want faster access to more content or want to be able to integrate more IOT devices into a system. The resource constraints in terms of computation, storage, and I/O extension, among others, are inherent to the mobile and end-user devices and pose additional challenges to meet the above demands. Edge computing has emerged as a solution in response to these demands. Edge computing is the use of computational resources closer to the end-user devices at the edge of a network. Edge computing places data acquisition and control functions, storage of high bandwidth content, and applications closer to the end-user. It typically is part of a larger cloud computing architecture.

An architecture employing edge computing differs from a traditional client-server architecture in that it adds an edge between the client and the server. The edge includes a combination of hardware and software infrastructure, and it is located nearer the end-user than the server. Some edges may be offloading systems that are used to overcome resource constraints on the end-user, while others may be onloading systems that allow backend servers to onload benefits or functionalities to the edge nearer to the end-users. Onloading edges are a more pragmatic solution as they have access to practically unlimited computational capability and they are powered by the cloud, which makes them suitable to support many different types of devices.

When a backend server, such as a web service, employs an onloading edge, the backend server onloads a service to the onloading edge. For example, a backend server such as a content provider or streaming service can onload a cache of popular videos to the onloading edge. This service (e.g., the cache of popular videos) is known as an edge function (EF). The EF is enabled by a combination of hardware and software infrastructure. The underlying software stack is known as an edge function platform (EFP). The backend servers that upload EFs to an edge must be assured that their server-specific logic, which is placed in their EFs, will be protected. For example, the backend servers want protections to prevent their content will not be leaked, that the valuable content they store in their EFs will not be stolen, and that the confidential information they have about their users will not be compromised. Because the edge is by definition deployed outside the control of the backend servers and near end-users, the backend server cannot trust the EFPs or any other software running on the edge for these assurances.

Use of edges in the traditional client-server architecture also present challenges to conventional end-to-end encryption. Web services have traditionally been delivered on end-to-end encrypted channels. But edge functions cannot access and process end-to-end encrypted traffic without first decrypting it, which violates the end-to-end security. Similar problems (i.e., establishing trustworthiness of an execution environment controlled by another entity) also manifest themselves in other configurations, such as cloud computing. But the solutions developed for cloud computing are inapplicable for edge computing because of the performance constraints on edge computing and the magnitude of the security risk. For example, high-performance overhead for us of mechanisms in end-to-end encryption would forfeit the latency benefits expected from the EF because of high-performance overhead. Additionally, because an edge has the ability to host multiple, unrelated tenant EFs, a compromised EF could pose risks to all other tenant EFs and their associated backend servers.

Homomorphic encryption-based applications or protocols have been studied as potential security solutions for edge devices. But these solutions require, however this requires substantial overhead which, as discussed, defeats the purpose of an edge function. Solutions that provide a trusted execution environment (TEE) by reducing the trusted entities to a small verifiable code and trusting only hardware have also been studied. These environments work by employing a remote attestation feature, which allows a host to verify its hardware and software to a remote host. But solutions employing TEEs have failed to bind the TEE and the communication channel, which makes the communication vulnerable to two well-known types of attacks: the time-to-check-to-time-to-use (TOCTTOU) attack and the cuckoo attack. A communication channel is vulnerable to a TOCTTOU attack if the attestation is performed before establishing the communication channel. And a channel is vulnerable to a cuckoo attack if the attestation is performed after establishing the communication channel.

Therefore, there exists the need for systems and methods that provide a secure mobile edge computing eco-system employing end-to-end encrypted communication and edge functions capable of withstanding compromised operating systems.

SUMMARY

Some or all of the above deficiencies may be addressed by certain embodiments of the disclosed technology. Disclosed embodiments provide systems and methods that provide a secure mobile edge computing eco-system.

Consistent with the disclosed embodiments, a method may include receiving, at a provisioner of an edge device, and from a console, a command to provision and edge function of the edge device, the command comprising logic and data associated with the functionality to be provided by the edge function. The method may further include performing remote attestation by receiving, from the console a request to verify the integrity of the edge function and transmitting back to the console verification, wherein the verification comprises the identity of the edge function and proof that the edge function has not been tampered with, wherein proof that the edge function has not been tampered with is a predetermined portion of logic. Further, the method may include receiving at the trusted part of the edge function and from the provisioner, the logic and data associated with functionality to be provided by the edge function. Further, encrypting, by the trusted part of the edge function, at least a portion of the logic and data associated with functionality to be provided by the edge function, the at least a portion comprising logic and data to be kept secure from the edge device, wherein the trusted part of the edge function is a hardware enabled trusted execution environment.

Wherein the method further includes transmitting, from the trusted part of the edge function to the untrusted part of the edge function, the at least a portion of the logic and data associated with functionality to be provide by the edge function to be kept secure from the edge device, wherein the untrusted part of the edge function processes all input and output requests with the edge device. The method further comprising writing, by the untrusted part of the edge function and to a memory associated with the edge device, the at least a portion of the logic and data associated with functionality to be provide by the edge function to be kept secure from the edge device. The method also including responsive to receipt, at the edge device and from a user, of a request to access data associated with the edge function, transmitting the request to the edge function, wherein the use is an end client associated with an edge function and a backend server. The method further providing responsive to receipt of the request at the edge function, establishing, by the edge function an OS-agnostic secure communication channel between the edge function and a backend server associated with the edge function. The method further providing that wherein, establishing an OS-agnostic secure communication channel between the edge function and backend server associated with the edge function comprises: performing remote attestation by transmitting, from the edge function a request to verify the integrity of the backend and transmitting back to the edge function verification, wherein the verification comprises the identity of the edge function and proof that the edge function has not been tampered with, wherein proof that the edge function has not been tampered with is a predetermined portion of logic.

The method further including, transferring from the edge function to the backend server associated with the edge function, the request from the user. Receiving, by the edge function and from the backend server associated with the edge function, a session key, wherein the session key is received through the OS-agnostic secure communication channel. Opening, by the edge function, the OS-agnostic secure communication channel to the user. Transmitting, to the user, the data associated with the user request, wherein transmitting the data associated with the user request comprises: determining, by the trusted part of the edge function whether the data requested is on the edge device. Further comprising, responsive to determining that the data is on the edge device, commanding the untrusted part of the edge function by the trusted part of the edge function to read the requested encrypted data from a memory associated with the edge device. Reading, by the untrusted part of the edge function, the requested encrypted data from a memory associated with the edge device. Transmitting, from the untrusted part of the edge function to the trusted part of the edge function, the requested encrypted data from a memory associated with the edge device. Decrypting, by the untrusted part of the edge the requested encrypted data. Transmitting, by the edge function and to the user, the requested data. Further, responsive to determining that the data is not on the edge device, forwarding the request for data to the backend. Receiving, from the backend and to the edge function, the data associated with the user request. Transmitting, by the edge function and to the user, the requested data.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
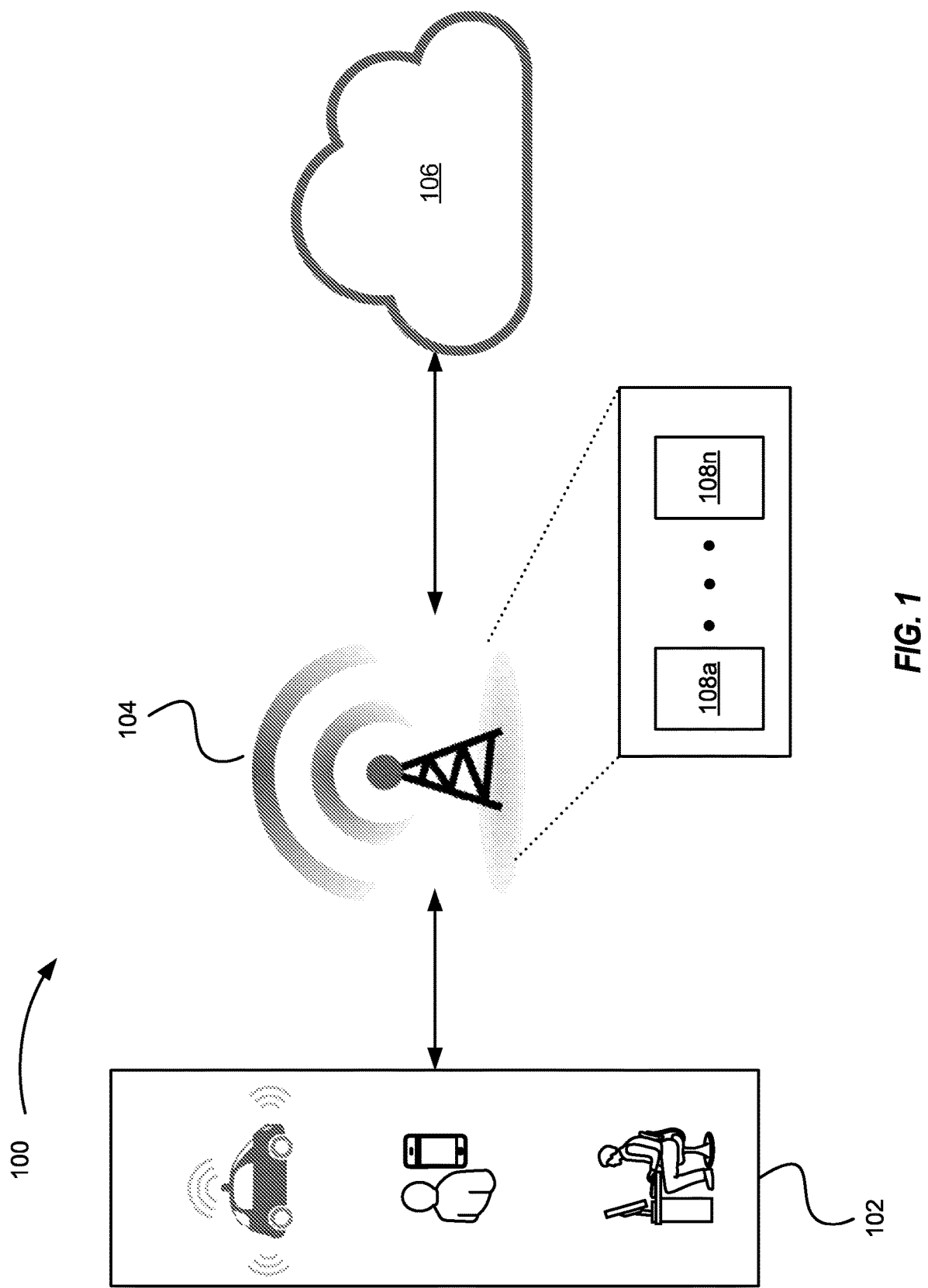
FIG. 1 is a block diagram of a mobile edge-computing ecosystem, according to an example embodiment.

As described herein, embodiments of the disclosed technology include systems and methods for providing a secure mobile edge-computing ecosystem. A secure mobile edge-computing ecosystem may be used to facilitate transmission of data to and from end-users and backend services through an edge. Unlike architectures where the client is in direct communication with the backend, the mobile edge-computing ecosystem adds an intermediary step of routing user requests to an edge. The edge comprises a hardware and software infrastructure and is located nearer the end-user than the backend. The backend may onload functionality, applications, or content to the edge in the form of the secure edge functions. When the backend onloads edge functions, it is uploading server-specific logic and/or content that needs to be protected. Because the edge is outside the control of the backend, the backend cannot rely on the infrastructure of the edge to maintain the security of its onloaded data. In traditional client-server architectures, this problem does not exist because the server is controlled by the backend. To address this security problem, the mobile edge-computing ecosystem employs secure edge functions. Mobile edge-computing systems of the present disclosure can address such problems by employing a trusted execution environment (TEE) that allows onloaded data to be stored securely. Such TEEs according to the present disclosure can be hardware-based, and they can allow an edge function inside the trusted execution environment to encrypt all the data uploaded to the edge. Accordingly, the edge function is insulated from the edge infrastructure and provides the backend with the assurance that even in the event that the edge infrastructure becomes corrupted, the backend's data will not be susceptible to breach.

Additionally, in a traditional client-server architecture, when a client makes a request to the server, the request is end-to-end encrypted in order to secure the communication. End-to-end encryption is broken when an edge is added to the equation. This break occurs because the edge is outside either the end-user or the backend' s reach of control. Therefore, termination at the edge violates the security protocols. To address this and ensure confidentiality of the communication between end clients and backends, embodiments of the mobile edge-computing ecosystem of the present disclosure can employ secured protocol extensions (SPX). These extensions enable edge functions to operate on encrypted traffic in collaboration with back-end services without violating end-to-end security semantics. SPX can use TEEs on the edge functions to augment the communication between end users and web services with additional communication between the edge and backed at an appropriate step in the protocol. In some implementations, TEEs employ a remote attestation feature, which allows a host to verify its hardware and software to a trusted remote host. SPX uses the TEEs to perform encryption and to perform attestation-bound handshakes between the edge and the backend in order to transfer session keys necessary for the edge function to communicate with the end client. The edge function can receive the session key from the backend, through a secure channel, and return it to the end client, thus allowing the edge function to initiate communication with the end client without violating end-to-end encryption protocols. As will be appreciated, because this method can be employed with existing security protocols, it can be integrated without making any changes made to the end client.

Aspects of the disclosed systems and methods, as will be discussed further herein, can address the high pressure placed on devices and infrastructure due to sheer amount of generated traffic while simultaneously requiring even lower response latencies for their interactive nature.

Throughout this disclosure, certain embodiments are described in exemplary fashion in relation to a mobile edge-computing ecosystem. However, embodiments of the disclosed technology are not so limited. In some embodiments, the disclosed technique may be effective in mobile and enterprise applications. Moreover, embodiments of the disclosed technique may be used in a variety of communication devices, such as smart phones, tablets, 5G MIMO systems such as mobile handsets and base station units, devices employing Internet-of-Things technology such as nest thermostats, connected appliances, and other similar devices.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. Of course, a person of ordinary skill in the art will recognize many modifications may be made to the configurations described herein without departing from the scope or spirit of the claimed subject matter.

Various systems and methods, are disclosed for mixed-single power amplification, and will now be described with reference to the accompanying figures.

FIG. 1 depicts a secure mobile edge-computing ecosystem 100, according to an example embodiment. As desired, embodiments of the disclosed technology may include a system architecture with more or less of the components illustrated in FIG. 1, which may themselves include more or less of the components illustrated in FIG. 19. It will be understood that the example secure mobile edge-computing ecosystem 100 shown in FIG. 1 is provided for example purposes only and does not limit the scope of the various embodiments of the present disclosed systems and methods.

A secure mobile edge-computing ecosystem 100 as shown in FIG. 1 may be used to facilitate transmission of data to and from end-users (or clients or end-clients) 102 and backend services 106 through an edge 104. Unlike architectures where an end-user (e.g., 102) is in direct communication with a backend (e.g., 106), implementations of a secure mobile edge-computing ecosystem 100 can add an edge 104. An edge 104 can include a hardware and software infrastructure and be located nearer the end-user 102 than the backend 106. The backend 106 may onload functionality, applications, or content to the edge 104 in the form of the secure edge functions 108. For example, a backend 106, such as a content provider or streaming service, may onload to the edge 104 a secure edge function 108 that serves as a cache of popular content (e.g., videos). As will be appreciated, when the backend 106 onloads such edge functions 108, the backend 106 is uploading server-specific logic and/or content that needs to be protected. In particular, because the edge 104 is outside the control of the backend 106, the backend 106 cannot rely on the infrastructure of the edge 104 to maintain the security of onloaded data. Secure edge functions 108 can address such problems by employing TEEs for secure storage and operation.

Additionally, in conventional client-server architectures, when an end-user (e.g., 102) makes a request to a backend (e.g., 106), the requests are end-to-end encrypted to secure the data. As will be appreciated, adding an edge 104 into system breaks the end-to-end encryption between a backend and a user because the edge 104 is outside the control of the end-user 102 or the backend 106. Therefore, terminating and decrypting the user's request at the edge 104 violates existing security protocols. To address this security concern and ensure confidentiality of the communication between end-user 102 and backends 106, mobile edge-computing ecosystems 100 of the present disclosure can employ secured protocol extensions (SPX). As will be appreciated, these extensions can build off of the shielded execution environments of the edge functions 108 to pass requests from the end client 102 to the backend 106. The extensions then allow the edge function 108 to receive a session key from the backend 106 through a secure channel and return it to the end client 102, which allows the edge function 108 to initiate communication with the end client 102 without violating end-to-end encryption protocols. Because such methods can be employed without modifications to existing security protocols, they can be integrated without any changes made to the end client 102, as will be appreciated.

In an example embodiment, aspects of a secure mobile edge-computing ecosystem 100, as shown in FIG. 1, may provide a portion of the system level functionalities as described in the European Telecommunications Standards Institute's (ETSI) famework and reference architecture for Mobile Edge Computing. In such an embodiment, a provisioner, as will be discussed herein, may be deployed on an edge host 104 and can provide what can be referred to as "virtualization support." The console, which also will be discussed herein, may act as a mobile edge orchestrator, either for mobile network operators or third parties. In other example embodiments, a secure mobile edge-computing ecosystem 100 as in FIG. 1 may interface with radio access network (RAN) equipment and may be deployed in mobile networks. In yet other embodiments, a secure mobile edge-computing ecosystem 100 as in FIG. 1 may be used in deployed enterprise settings. In such embodiments, a secure mobile edge-computing ecosystem 100 may be integrated with on-premise virtual customer premise edge (vCPE) equipment to securely provision and manage EFs.

Figure 2:
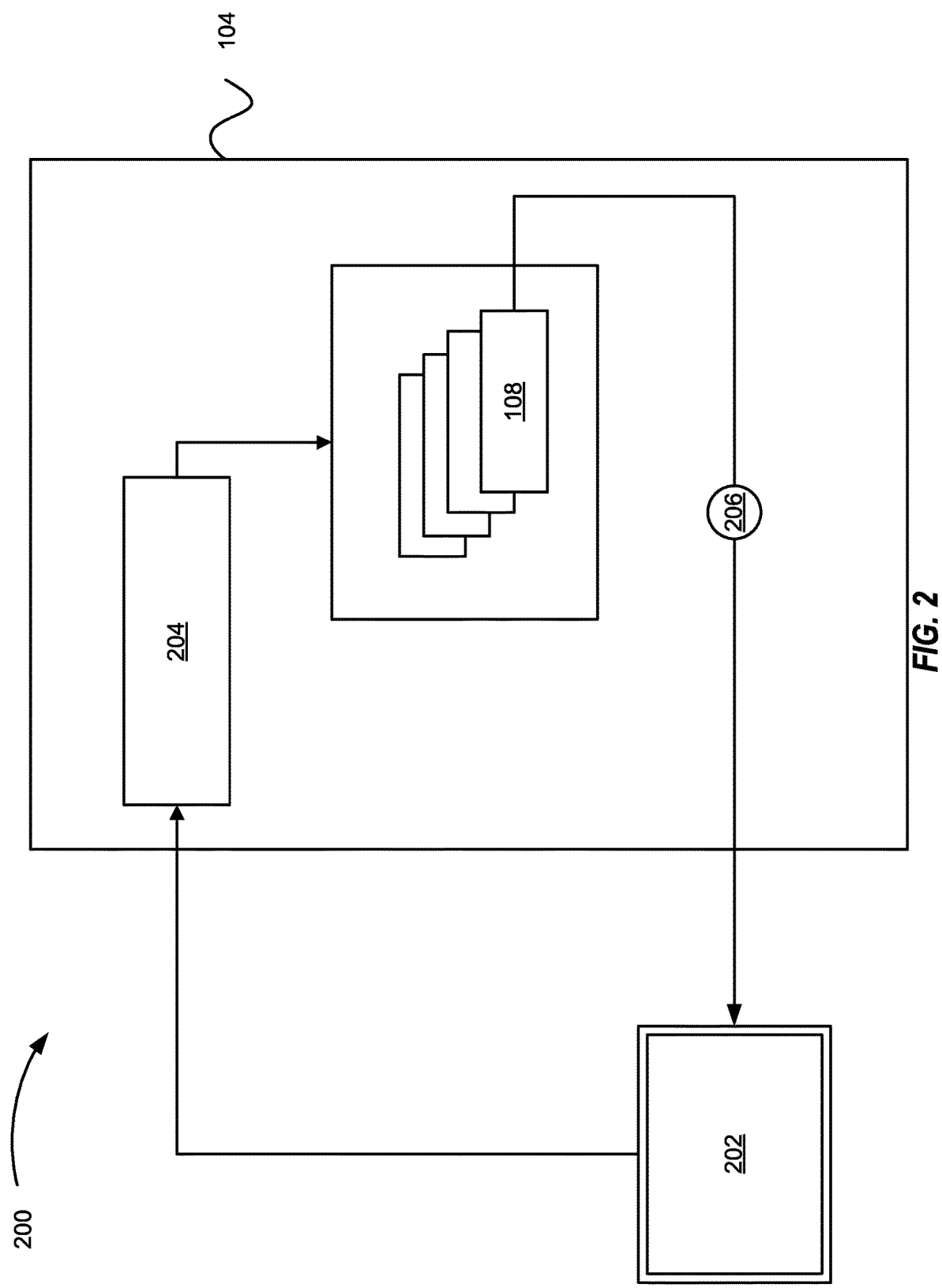
FIG. 2 is a block diagram of an EF provisioning design, according to an example embodiment.

FIG. 2 depicts an implementation of secure EF provisioning 200, according to example embodiments of the present disclosure. As explained, such secure EF provisioning architectures 200 may allow for dynamic deployment of services at remote sites. In some embodiments, a secure EF provisioning architecture 200 may include a console 202, a provisioner 204, and a secure EF 108. The console 202 may be a web management system, located away from the edge 104, that allows managers manage and deploy secure EFs 108 on the edge 104. A manager or system administrator may, for example, input a command at the console 202 that is delivered provisioner 204. The console 202 and the secure EF 108 may both employ TEEs such that the console 202 may be able to verify the integrity of the EF 108 through remote attestation (as represented by 206). In some embodiments, the remote attestation may be performed when the console 202 sends a request for verification to the EF 108 and the EF 108 responds with the necessary verification data. The verification data may comprise the identity of the EF 108 and proof that the EF 108 has not been compromised. Such proof may be in the form of a piece of the predetermined logic or data that is loaded onto the EF 108 by the provisioner 204. In some embodiments, EFs 108 can be patched with a binary that prompts the console 202 and secure EF 108 to carry out remote attestation on boot up. Once the console 202 verifies the integrity of the secure EF 108 through remote attestation, the provisioner 204 can interact with the local virtualization software on the edge 104 to onload the services to the secure EF 108. As will be appreciated, because the console 202 is located on a trusted server and employs a TEE, the EF 108 can be securely provisioned. In some embodiments, the console 202 may be provided in connection with the backend 106. In other embodiments, the console 202 may be provided as a cloud-based service by a third party. In some embodiments, the provisioner 204 can be built as an extension of the Docker command line interface to include specific commands, such as attestation and authentication, and can accept provisioning requests from the console 202.

Figure 3:
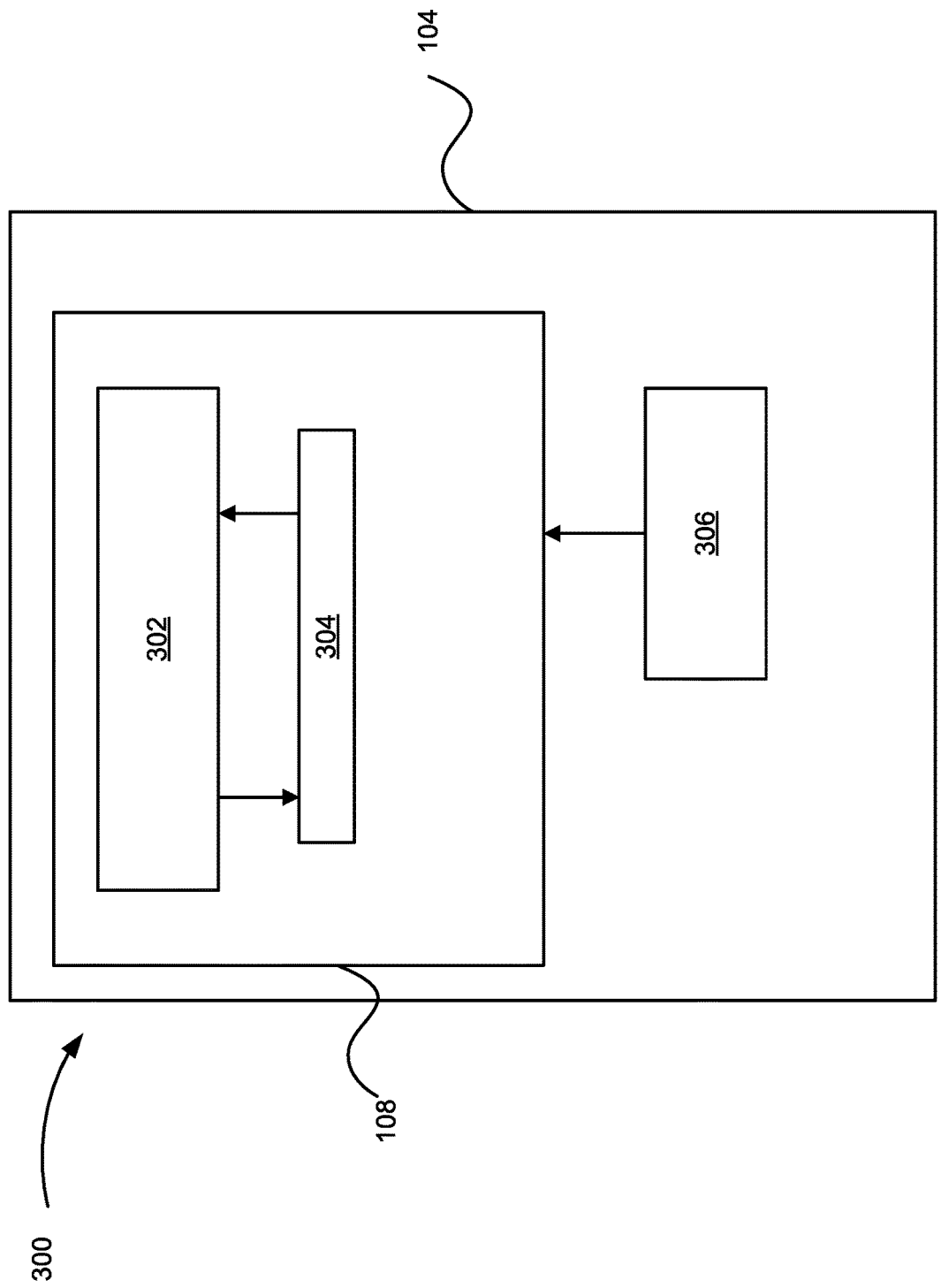
FIG. 3 is a block diagram of a secure EF design, according to an example embodiment.

In addition to providing for the secure provisioning of secure EFs 108, the secure mobile edge computing ecosystem 100 can provide further security in the inclusion of secure EFs 108. FIG. 3 depicts an architecture of a secured edge function 108, according to an example embodiment. A secure EF 108 as shown in FIG. 3 may be used to ensure secure execution and storage on the untrusted edge 104 by insulating the functionality and data onloaded to the EF 108 from the untrusted edge 104. In some embodiments, a secure EF 108 may employ a TEE such that it includes an untrusted part 302 and a trusted part 304. As will be appreciated, the overhead required to operate a trusted part 304 of an EF 108 makes it impractical to place the entire EF 108 functionality here. To minimize the overhead associated with the TEE, the edge 104 can be configured to instruct the untrusted part 302 of the secure EF 108 to handle network and storage interactions exposed to the secure EF 108. Further, the trusted part 302 of the secure EF 108, which is inaccessible they unprotected edge 104, can be responsible for executing application specific logic received from a backend.

In addition to secured execution of instructions received from a backend or a user, the secure EF 108 can provide for secured storage, as may be required by certain EFs 108 for requests, responses, and data. In some implementations, to store data securely on an untrusted edge 104, an edge function 108 can interact, by way of the untrusted part 302, with storage 306 exposed to the edge function 108 by the untrusted edge 104. Before the trusted part 302 instructs the untrusted part 302 to store data, the trusted part 304 encrypts the data. In some embodiments, the trusted part 304 uses a TEE-specific encryption key to encrypt the data. The trusted part 304 then passes the encrypted data to the untrusted part 302 along with instructions for the untrusted part 302 to write the data to a specific location on storage 306. To read a file from the storage 306, the trusted part 304 instructs the untrusted part 302 to read the encrypted data and pass it to the trusted part 304, where it can be decrypted. In some embodiments, the trusted part 304 uses a TEE-specific encryption key to decrypt the data.

In some embodiments, the amount of memory allocated to the trusted part 304 of an EFS 108 may be minimized to reduce overhead. In such embodiments, the amount of data to be processed by the trusted part 304 may exceed the amount of allocated memory. To overcome such constraints without increased overhead, the EF 108 may employ a trampoline-based memory management approach, such that larger memory is sliced and reassembled. In other embodiments, the EF 108 may carry out input/output (IO) functions as a two-phase process. In such embodiments, the first phase may consist of the EF 108 sending metadata to storage 306, and the second phase may consist of ensuring that proper encryption/decryption occurred in phase one and then proceeding to read/write the storage as described above. As will be appreciated, such an embodiment can allow the EF 108 to verify that the content served to clients is encrypted with the appropriate key and that data saved in storage is encrypted with the appropriate key.

Figure 4:
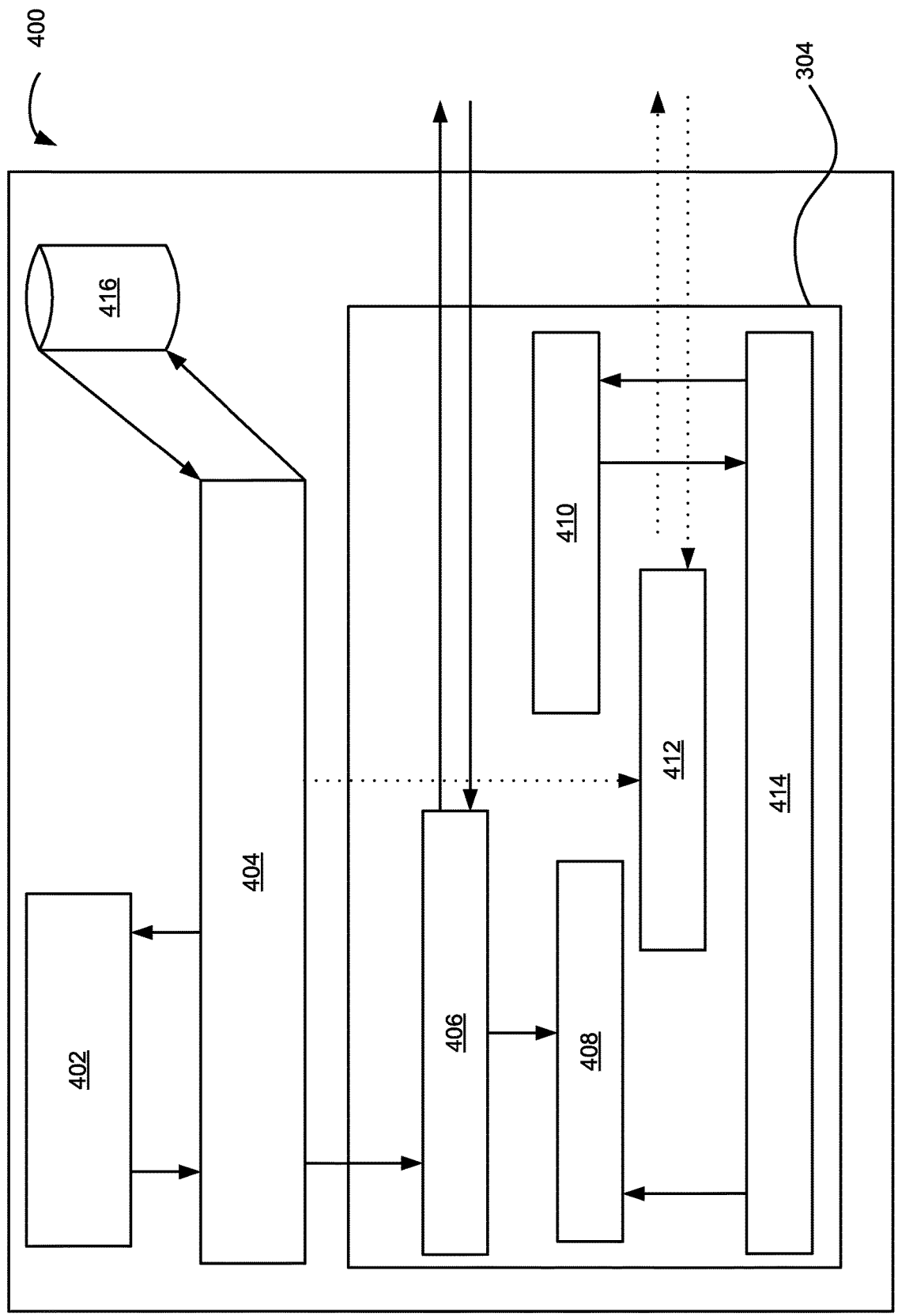
FIG. 4 is a block diagram of a secure caching EF, according to an example embodiment.

FIG. 4 depicts an implementation of a secure caching edge function 400, according to an example embodiment. A caching EF 400 can store the responses for client requests and then use those stored responses to service other clients or the same client having the same requests. In some embodiments, the interface 404 receives the requests from an end user 102. Upon receipt of the request, the interface 404 implements input and output between the secured part 304 and the edge 104. Additionally, the interface 404 can request the trusted part 304 to carry out remote attestation through remote attestation interface 412. When a request is received from an end-user by the interface 404, the interface 404 can implement a proxy functionality 402. In some embodiments, the proxy 402 functions to set up required network connections and pass encrypted requests to the trusted part 304. After the proxy functionality is set up, the interface 404 then passes the encrypted request to the trusted part 304. In some implementations, if the session key for the request is not available, the EF 400 can request it through the remote authentication interface 406 and save it for the current session. Once the EF 400 secures the key, the EF 400 can decrypt the request through the session encryption/decryption interface 408. The request then can be used by the trusted part 304 to command the interface 404 to access content in the file system 416. When the interface 404 retrieves content from the file system 416, the interface 404 passes the content to the sealing encryption/decryption interface 410 before responding to the request. In the event that the request requires the EF 400 to respond to the user with content, the interface 404 can handle interactions with EF 104 provided storage 416. In some implementations, the storage 416 can take the form of a disk that provides storage capability without any security guarantees.

In an additional example embodiment, the EF 108 may be a secure aggregating EF 108, which can store multiple requests and/or data from end-users 102 and send a single request to a backend 106 while removing redundant information from the requests. In an example embodiment, such an EF 108 may be an IoT hub on an edge 104 that aggregates traffic from different end-user 102 sensors and sends the information to the backend service 106, thus resulting in reduced bandwidth usage. In various embodiments, the aggregation function can be supplied by either the end-user 102 or the backend 106. In another example embodiment, the EF 108 may be a buffering EF 108. Such an example buffering EF 108 can store responses from a backend service 106 using the storage available on the edge 104 on behalf of one or more end-users 106 to pre-fetch, buffer the responses, and deliver them in appropriate context. The context in which the EF 108 delivers the responses can be based on when a user connects to a particular edge 104 (e.g., when the user is at home, at the office, etc.). In other embodiments, context in which the EF 108 delivers the responses can be controlled as a feature of the backend service 106. For example, a backend 106 may give the user 102 an option to receive individual notifications or to bundle notifications and deliver them in a digest. Such example buffering EFs 108 can reduce overheads on battery operated end-user devices 102 and can improve delivery performance, as will be appreciated. In an example embodiment, the backend 106 may be a social networking site or application and the end-user 102 may be viewing the application on a mobile device. In such an embodiment, the end-user 102 may authorize the social networking EF 108 to fetch and buffer the notifications and deliver them when the end user 102 returns home.

Figure 5:
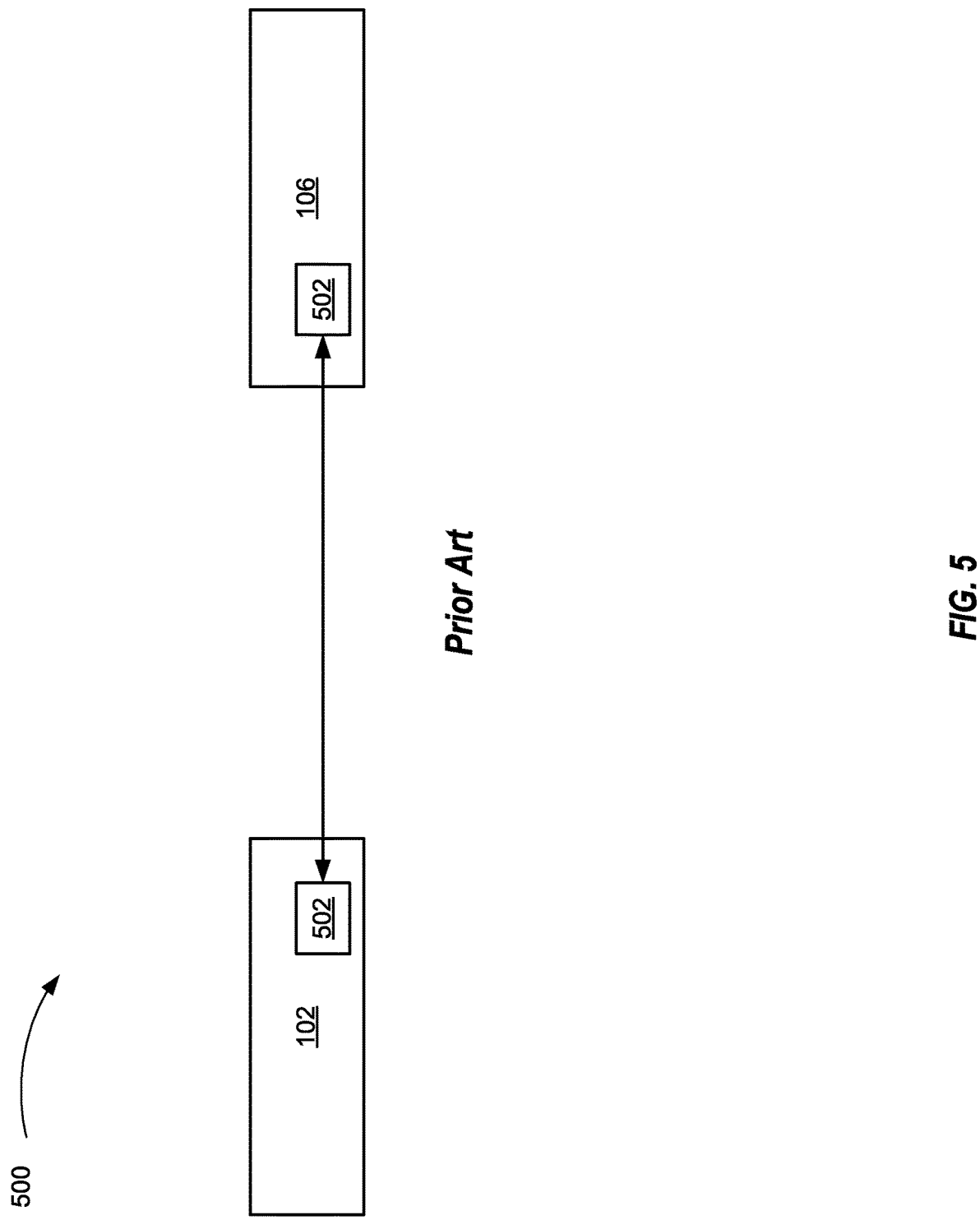
FIG. 5 is a block diagram of a generic SPX, according to an example embodiment.
Figure 6:
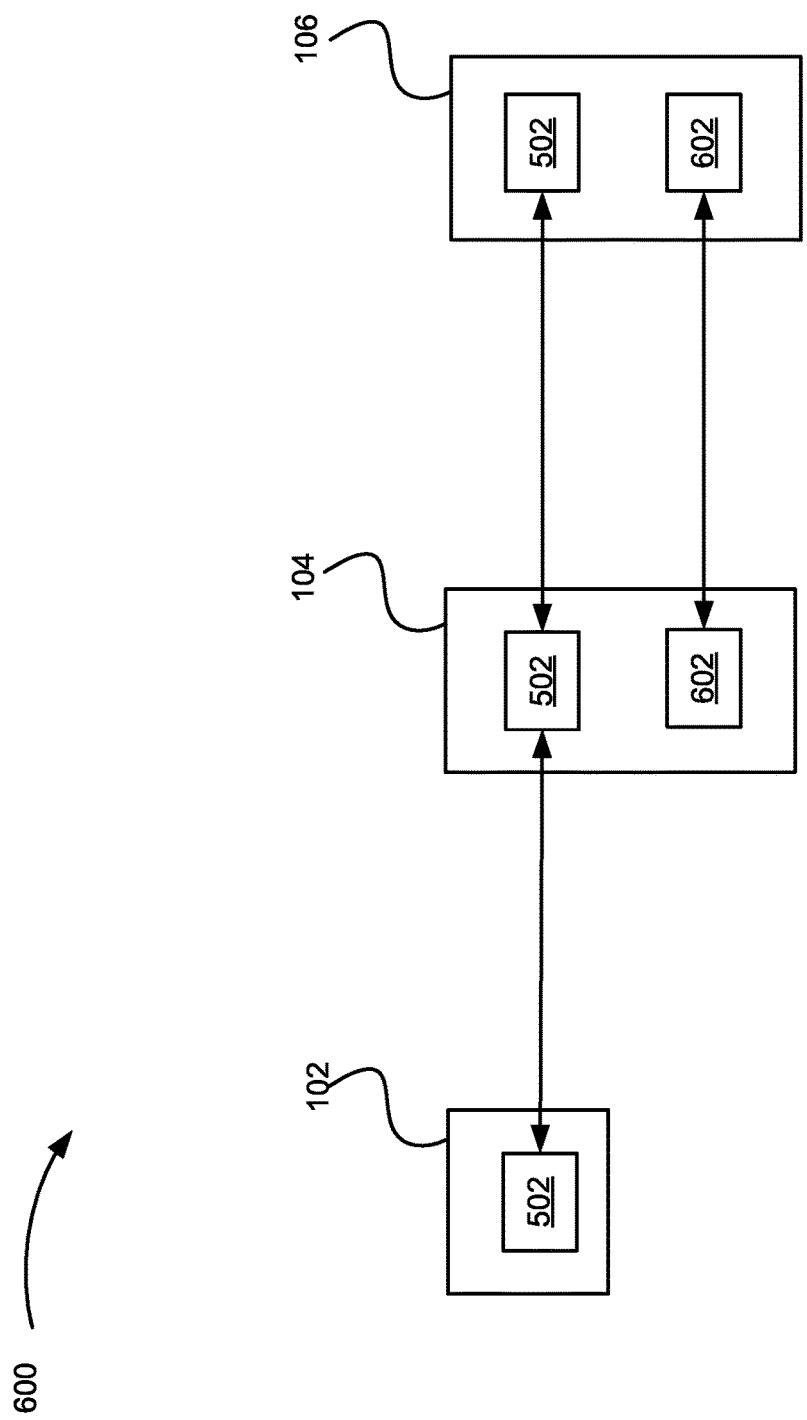
FIG. 6 is a block diagram of an interaction between an end-client and a web service, according to existing mobile-cloud scenarios.

In addition to providing secure operation and storage through the use of secure EFs 108, a secure mobile edge-computing ecosystem as depicted in FIG. 1 can provide confidential communications through the use of secure protocol extensions (SPX) that enable end-to-end encryption from end-user 102 to backend 106. FIG. 5 depicts a general security protocol approach 500, according to existing mobile cloud architectures comprising an end-user 102 (e.g., a user device) and a backend 106 (e.g., a web service). A general security protocol approach 500 of FIG. 5 may be used to allow the data transferred between an end-client 102 and a backend 106 to be delivered on end-to-end encrypted channels through general security protocol 502 (e.g., the TLS protocol). As previously discussed, this type of approach is undesirable for edge computing architectures, such as those shown in FIG. 1, because termination of the client data at the edge breaks the end-to-end encryption. FIG. 6 depicts a secure protocol extension (SPX) approach 600, according to an example embodiment, that may be used to enable end-to-end encryption channels for edge computing architectures similar that of FIG. 1. As shown in FIG. 6, according to some embodiments, an SPX approach 600 may comprise an end client 102, an edge 104, a backend 106, a general secure protocol 502, and an SPX 602. The approach 600 may allow the communication channel between the client 102 and edge function 104 to be secured transparently as if the client 102 was directly communicating with the server 106. SPX 602 achieves such transparent security by using TEEs to perform encryption and using an attestation-bound handshake protocol to transfer a generic protocol 502 session key from the backend 106 to the edge 104.

As depicted in FIG. 6, the end client 102 can send a request over the general secure protocol 502. The edge 104 can receive that request and relay the request to the backend 106. In addition, SPX 602 can send additional information with the request that binds the attestation with an ephemeral public key to the backend 106. When the edge 104 receives the request, the SPX 602 can monitor the entire handshake process and extract the relevant information necessary to communicate with the client 102. In some embodiments, the SPX 602 can use TEEs to establish an OS-agnostic secure channel between the edge 104 and the backend 106. The OS-agnostic secure channel can be secured by performing remote attestation between the TEEs on the edge 104 and on the backend 106. The backend 106 can transfer the session key through the OS-agnostic secure channel to the edge 104. The edge 104 can then send the session key to the client 102 during the secure session setup in the protocol, and the OS-agnostic secure channel between edge 104 and backend 104 is relayed to client 102 by the edge 104, thus allowing for secure communication between the client 102 and the edge 104 with same security properties as communication between client 102 and the backend 106.

Figure 7:
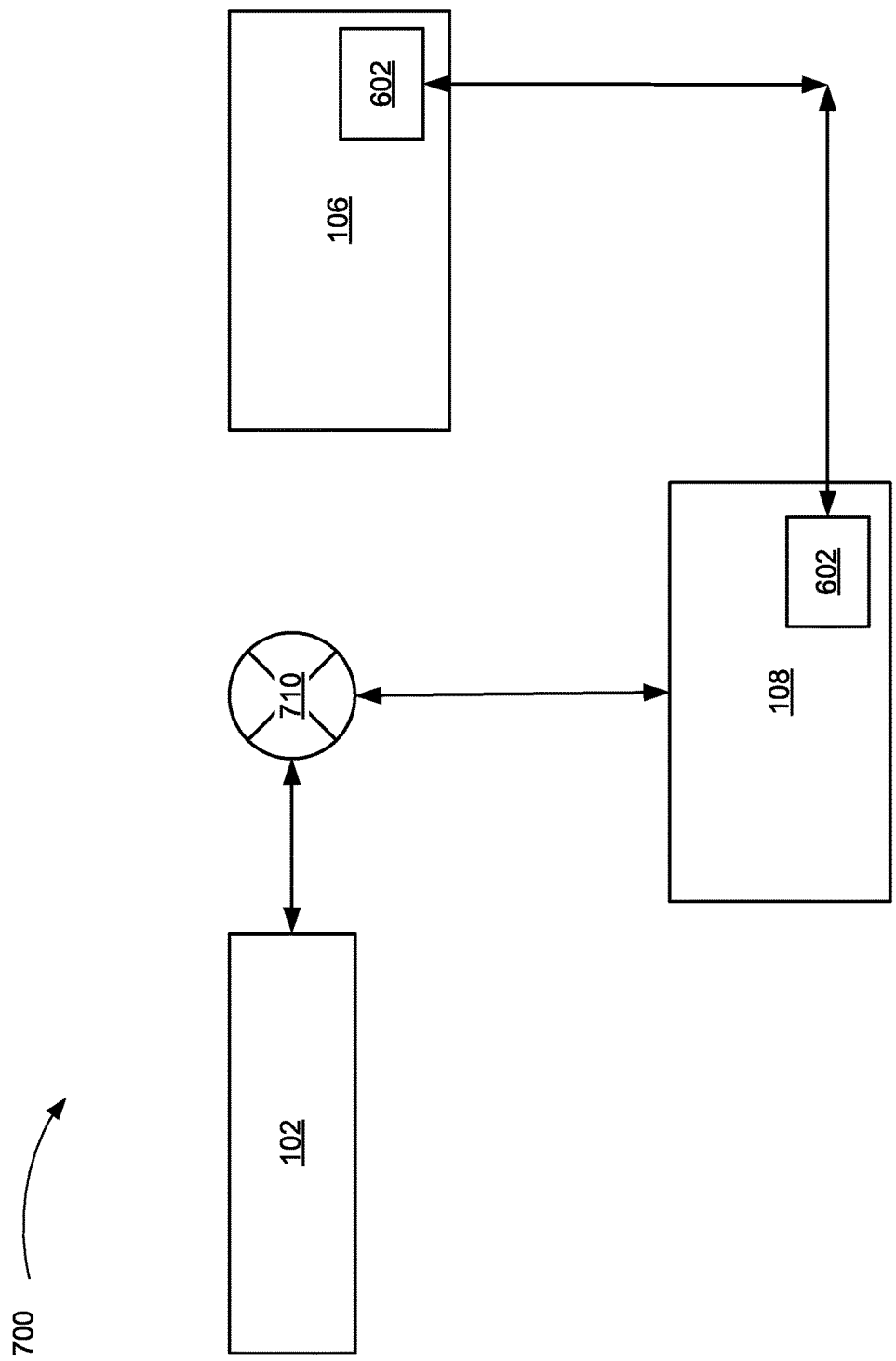
FIG. 7 is a block diagram of an interaction between an end-client, an edge function, and a web service, according to an example embodiment.

In an example embodiment, as shown in FIG. 7, the end client 102 can be a user device, such as a mobile computing device or a personal computer, and the backend 106 can be a web service. In this embodiment, the EF 108 can be an SPX-enabled EF. The SPX-enabled EF 108 can use the TEE to establish an OS-agnostic secure channel between the EF 108 and the backend 106. The end client 102 can send a request, which can be routed (represented by 710) to the SPX-enabled EF 108. In some embodiments, the routing 110 can be a DNS-based redirection. In other embodiments, the routing 110 can be facilitated by an explicit mechanism deployed by the edge infrastructure 104 such as a redirecting of RAN packets to appropriate EFs 108 by a match-forward rule or HTTPS-based redirection. The SPX-enabled EF 108 can then communicate with the backend 106 through the secure channel to retrieve the session key before the end client 102 and the EF 108 complete their handshake. When the EF 108 retrieves the session key, it can relay the same secure channel to end client 102 that was created between backend 106 and EF 108, thus allowing for secure communication between the client 102 and the edge 104 with same security properties as communication between client 102 and the backend 106.

In some example embodiments, an SPX 602 may be limited by the amount of memory addressable to a TEE. In such an embodiment, an SPX 602 may use a spilling mechanism such as a session look-up table that spills over to host memory if the memory available in the TEE is insufficient. In such embodiments, an SPX 602 may use the secured EF 108 to securely store the information as described above. In another example embodiment, an SPX may be limited by number of TEEs that can be used simultaneously. In such embodiments, an SPX 602 may only require one TEE instantiation per EF 108 as opposed to per session. In yet other embodiments, an SPX 602 may be limited by the number of logical CPUs available. In such embodiments, an SPX 602 may minimize the time required in binding by monitoring the state of the handshake.

Figure 8:
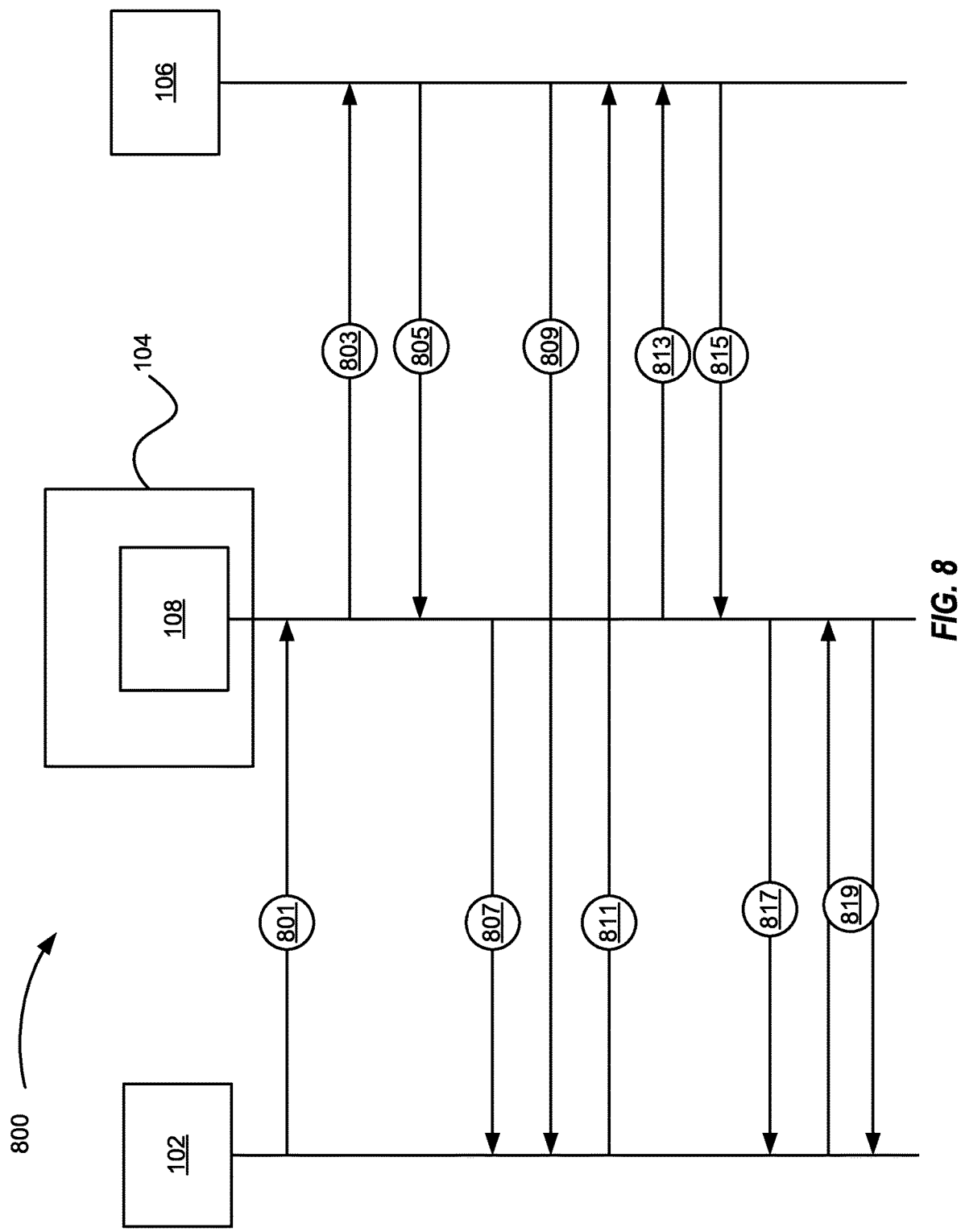
FIG. 8 is a diagram depicting an SPX enabled TLS, according to an example embodiment.

According to some embodiments, the SPX 602 may be realized for a TLS protocol having two sub protocols: the handshake protocol and the record protocol. The handshake protocol can be for negotiating security parameters for the record protocol, authenticating two peers, reporting errors, and prevention of attacks. As will be appreciated, TLS protocol guarantees, through use of a public key, that only the two communication peers (client and server) have access to the randomly generated session key used in the record protocol. FIG. 8 depicts TLX 800, which is an SPX-enabled TLS protocol, according to an example embodiment. TLS 800 of FIG. 8 may be used to securely transfer the TLS-generated session key from the backend 106 to a TLX-enabled edge function 108 without trusting the edge 104. In some embodiments, at 801, a TLX-enabled EF 108 can detect an initiation message as a TLS extension from the end-client 102. As shown at 803, the TLX-enabled EF 108 can add in a request as a TLS extension and forward the message to the backend 106. At 805, the backend 106 can send a response as a TLS extension to the TLX-enabled EF 108. At 807, the TLX-enabled EF 108 can strip the response from the backend 106 and send the rest of the messages to the end-client 102. At 809, the backend 106 can send certificate to end client 102 by way of the SPX-enabled EF 108 forwarding the certificate as per TLS protocol specifications. At 811, the client 102 can request the cipher change as described in TLS protocol specification. At 813, the SPX-enabled EF 108 can generate an attestation and send it to the backend 106 along with the client response. At 815, the backend 106 can verify the public key and send the session key to the SPX-enabled EF 108. At 817, the SPX-enabled EF 108 can decrypt the session key and forward it to the end-client 102. At 819, the secure session is finalized between client 102 and TLX-enabled EF 108.

Figure 9:
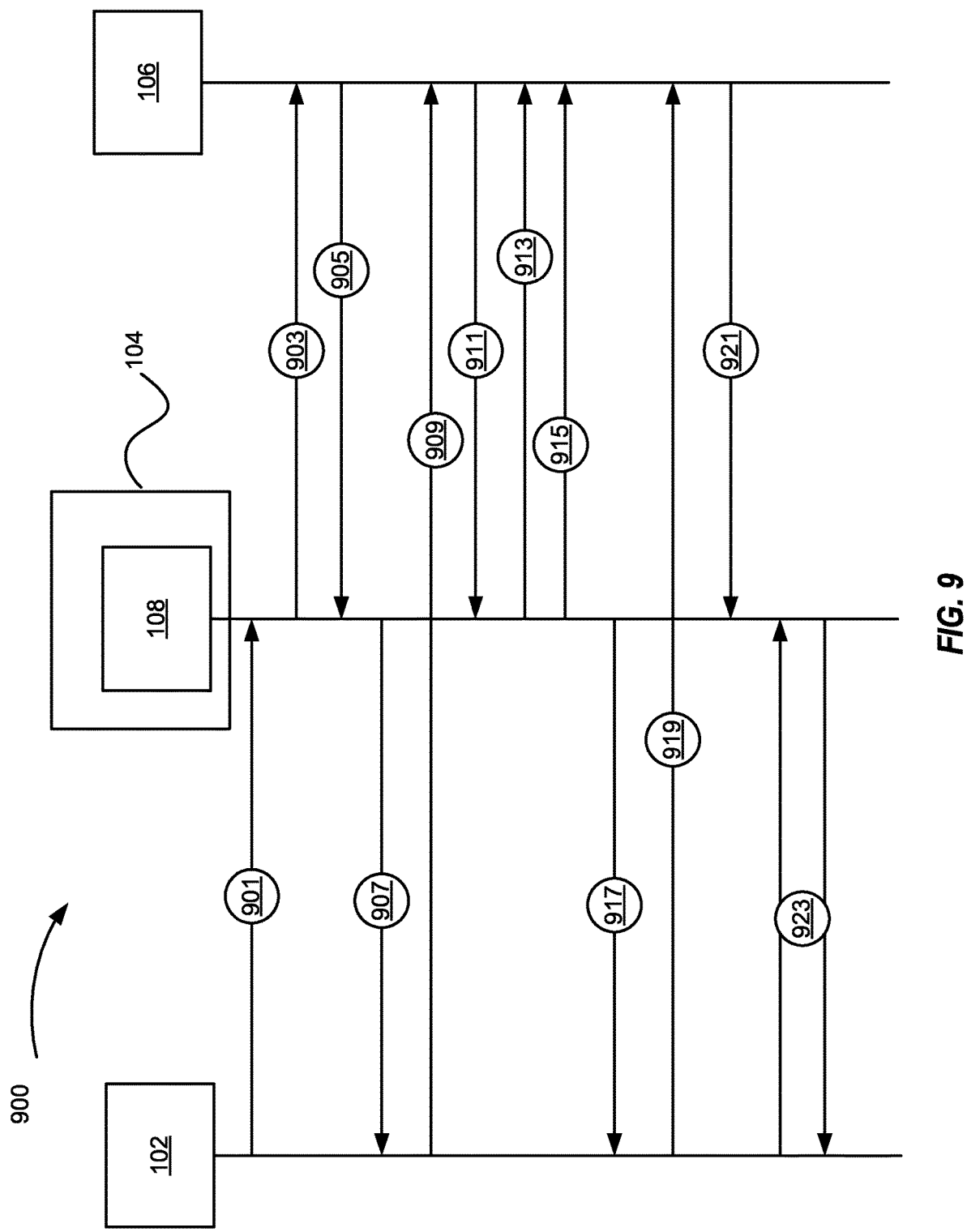
FIG. 9 is a diagram depicting an SPX enabled Noise framework, according to an example embodiment.

According to other embodiments, the SPX 602 may be realized for any secure protocol built using noise protocol framework, a framework for crypto protocols based on Diffie-Hellman key agreement. FIG. 9 depicts an SPX enabled Noise protocol 900, according to an example embodiment. To achieve end-to-end encryption on a client (initiator) 102, edge (handler) 104, backend (responder) 106 system employing the Noise XX handshake, SPX functions are added that are carried out between handler (edge) 104 and responder (backend) 106. Other noise protocols are supported in similar manner. In an example implementation, at 901, initiator 102 can send prologue to responder 106 via handler 104. At 903, handler 108 can intercept prologue and add attestation information to the prologue and then forward to responder 106. At 905, responder 106 can respond to handler 104 with prologue and its own attestation information. At 907, handler 104 removes the attestation information and sends the prologue to initiator 102. At 909, handler 104 forwards the initiator's 102 message to responder 106. At 911, handler 104 intercepts the responder's response and sends its attestation report to responder 106 along with bind request at 913 and 915 respectively. At 917, handler 104 can respond to initiator 102 with message exchanges as per protocol specification. At 919 the initiator 102 shares the session key with the responder 106. At 921, responder 106 shares session key with handler 104. Finally, at 923, the secure session is finalized between handler 104 and end client 102.

Experimental Results

A test system was implemented employing secure provisioning similar to that shown in FIG. 1 and a secure edge function similar to that shown in FIG. 2. Simulations were performed using OpenSGX as an emulator platform on and then compared to benchmarks. FIGS. 10A-12 show the results of the simulations of the example design.

Figure 10A:
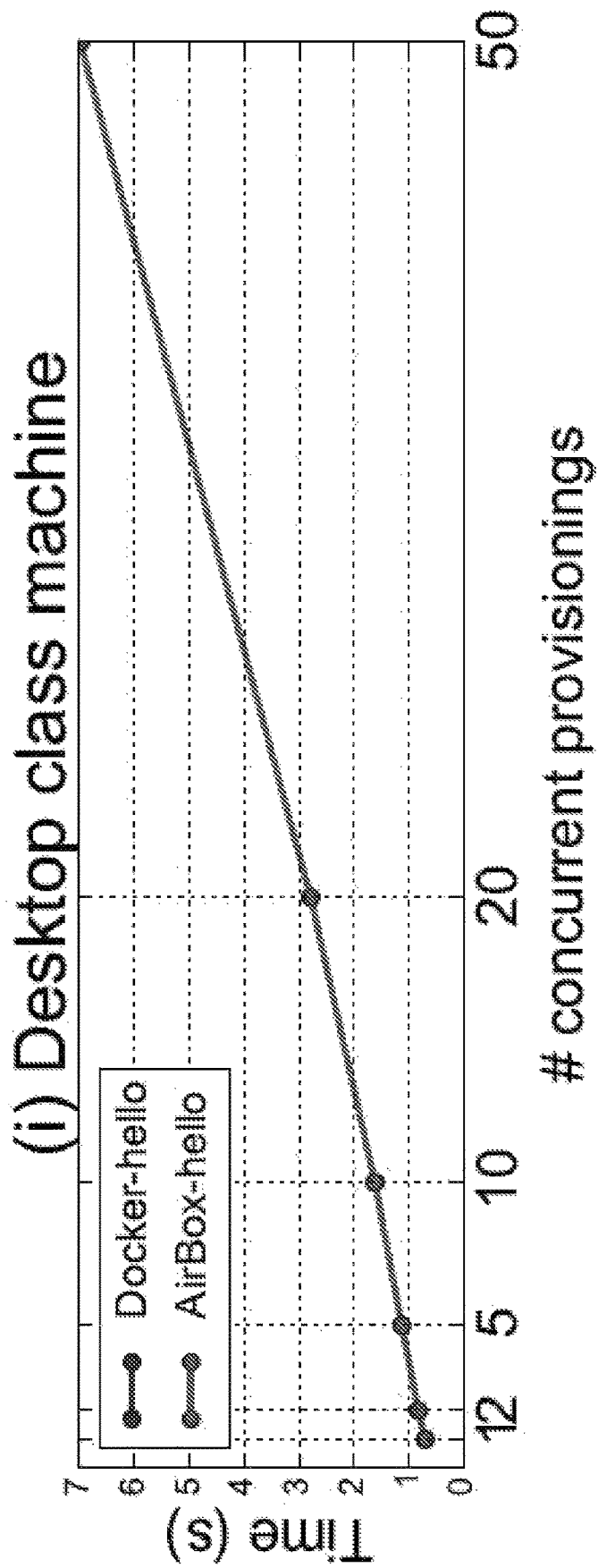
FIGS. 10A-10B are charts depicting the simulated time spent provisioning EFs using Airbox, according to an example embodiments.
Figure 10B:
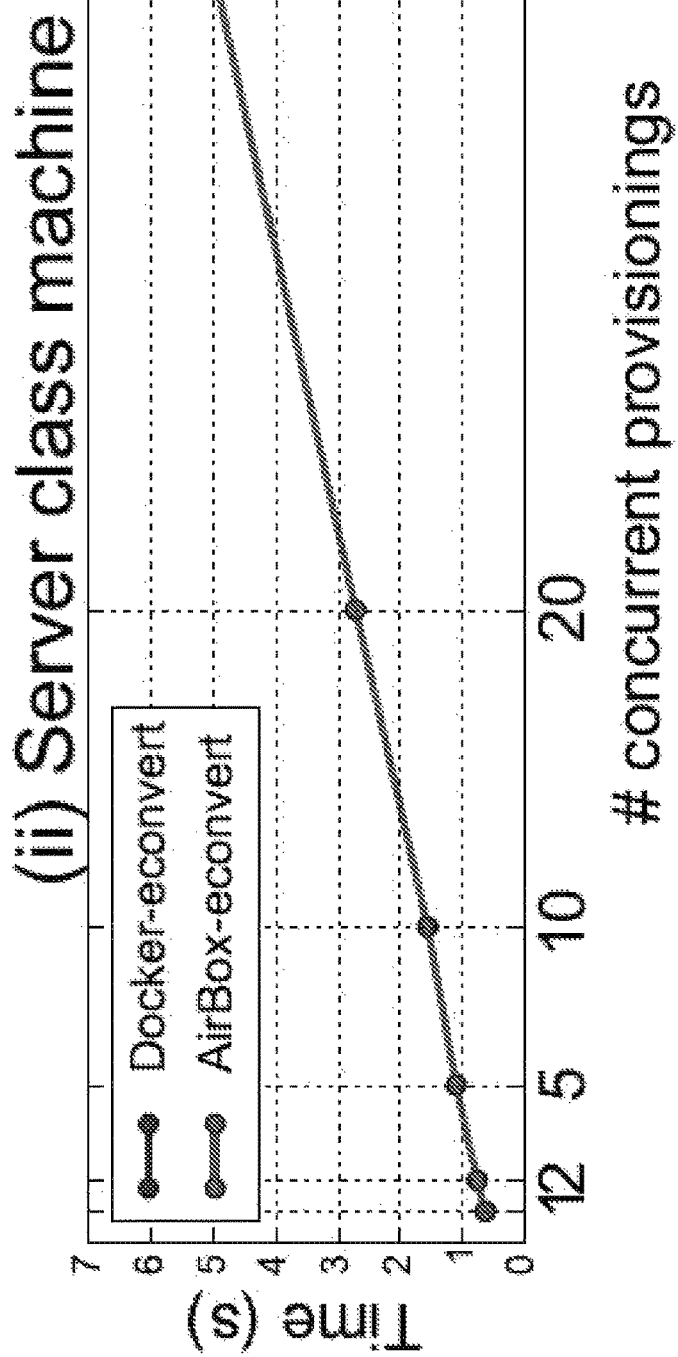

The graph in FIG. 10A shows the baseline provisioning time (Docker) and the example design (AirBox) provisioning time for an application vs. increasing number of simultaneous provisioning requests for a desktop class machine. The graph in FIG. 10B shows the baseline provisioning time (Docker) and the example design (AirBox) provisioning time for an application vs. increasing number of simultaneous provisioning requests for a server class machine. FIGS. 10A and 10B show the difference in provisioning is virtually 0 (order of ms), thus demonstrating that the attestation during provisioning according to the disclosed embodiments adds virtually no overhead.

Figure 11A:
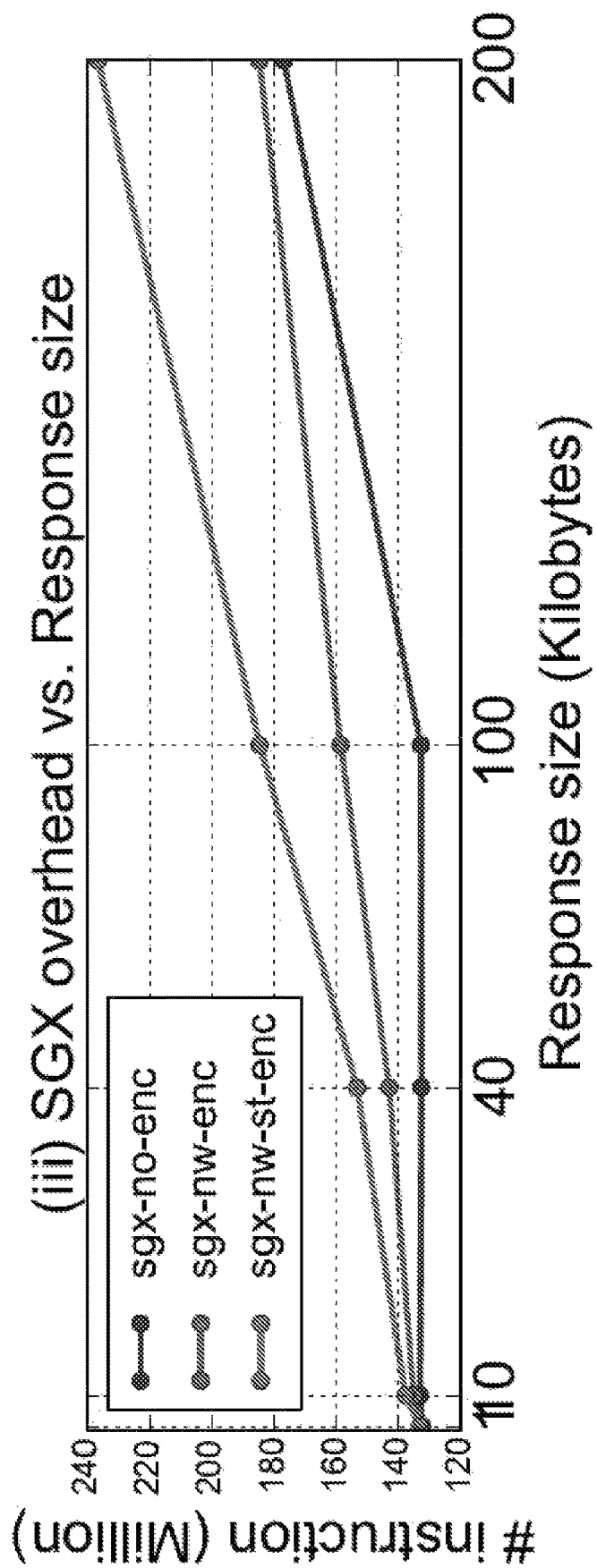
FIGS. 11A-11B are charts depicting the variation of overhead with size of data transfer between host and enclave, according to an example embodiment.
Figure 11B:
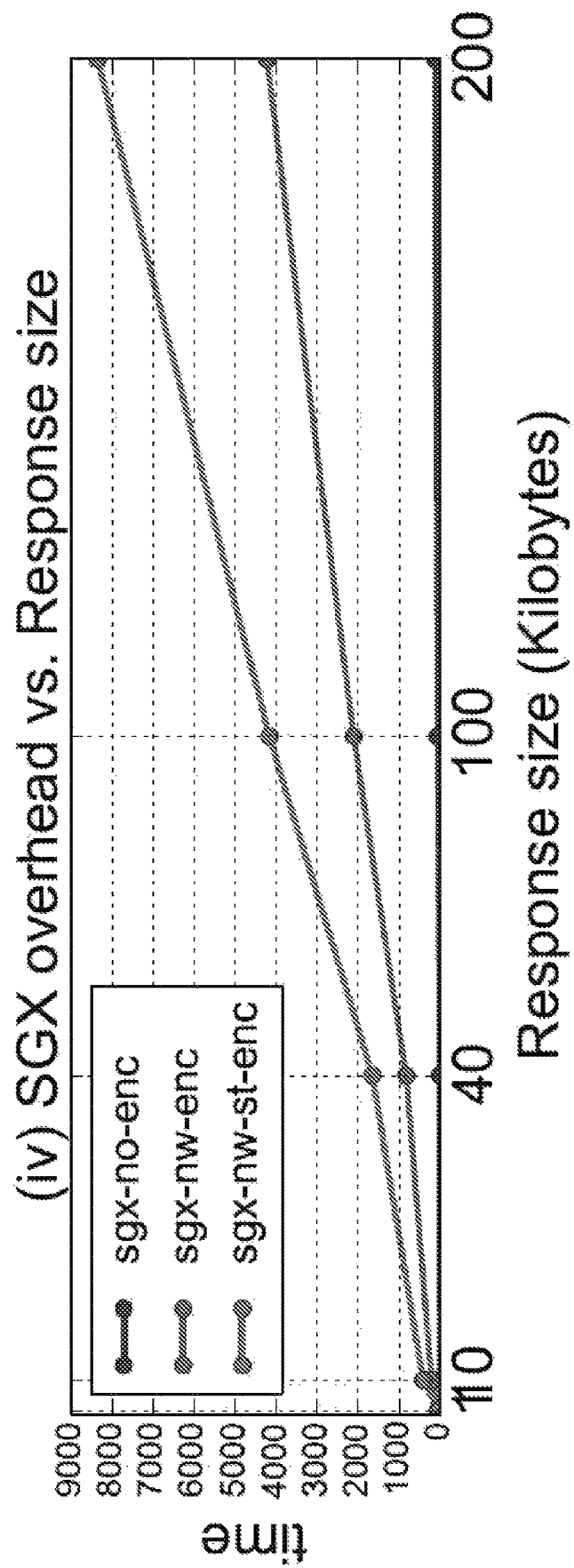
Figure 12:
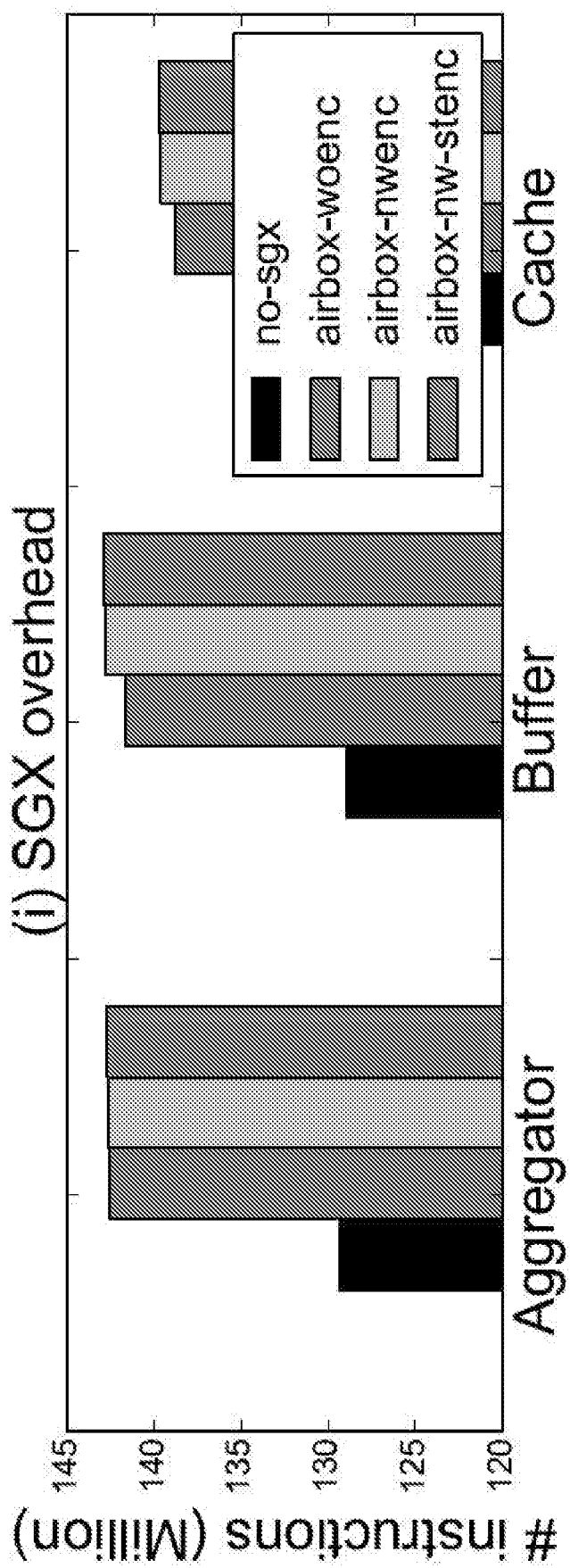
FIG. 12 is a chart depicting the overhead in use cases, according to an example embodiment.

The graph in FIG. 11A shows the variation of instruction overhead size of data transfer between a host and enclave with no encryption, with only network interaction encryption, and with both network and storage encrypted. The graph in FIG. 11B shows the time overhead transfer between a host and enclave with no encryption, with only network interaction encryption, and with both network and storage encrypted. FIGS. 11 A and 11B show that the overhead of including only network encryption and both network encryption and storage encryption are approximately 0.8 ms and 0.4 ms, respectively, when the request size is up to 200 KB, demonstrating that there is a negligible overhead for performing purely a memory copy operation from host to enclave. The graph of FIG. 12 shows the overhead for baseline cases due to the use of SGX for security. FIG. 12 shows that there is an overhead of roughly 10-15% with added SGX security, demonstrating that increased security based on the disclosed embodiments can be achieved without sacrificing performance.

An example design employing an SPX-enabled TLS as shown in FIG. 8 on was simulated on a test system comprising a client, edge, and server machines with 6th generation Intel processors with SGX support. Simulations were performed using echo protocol over TCP socket connection. FIGS. 13-16 show the results of the simulations of the example design compared to the results through traditional end-to-end encryption schemes employing only a client and a server.

Figure 13:
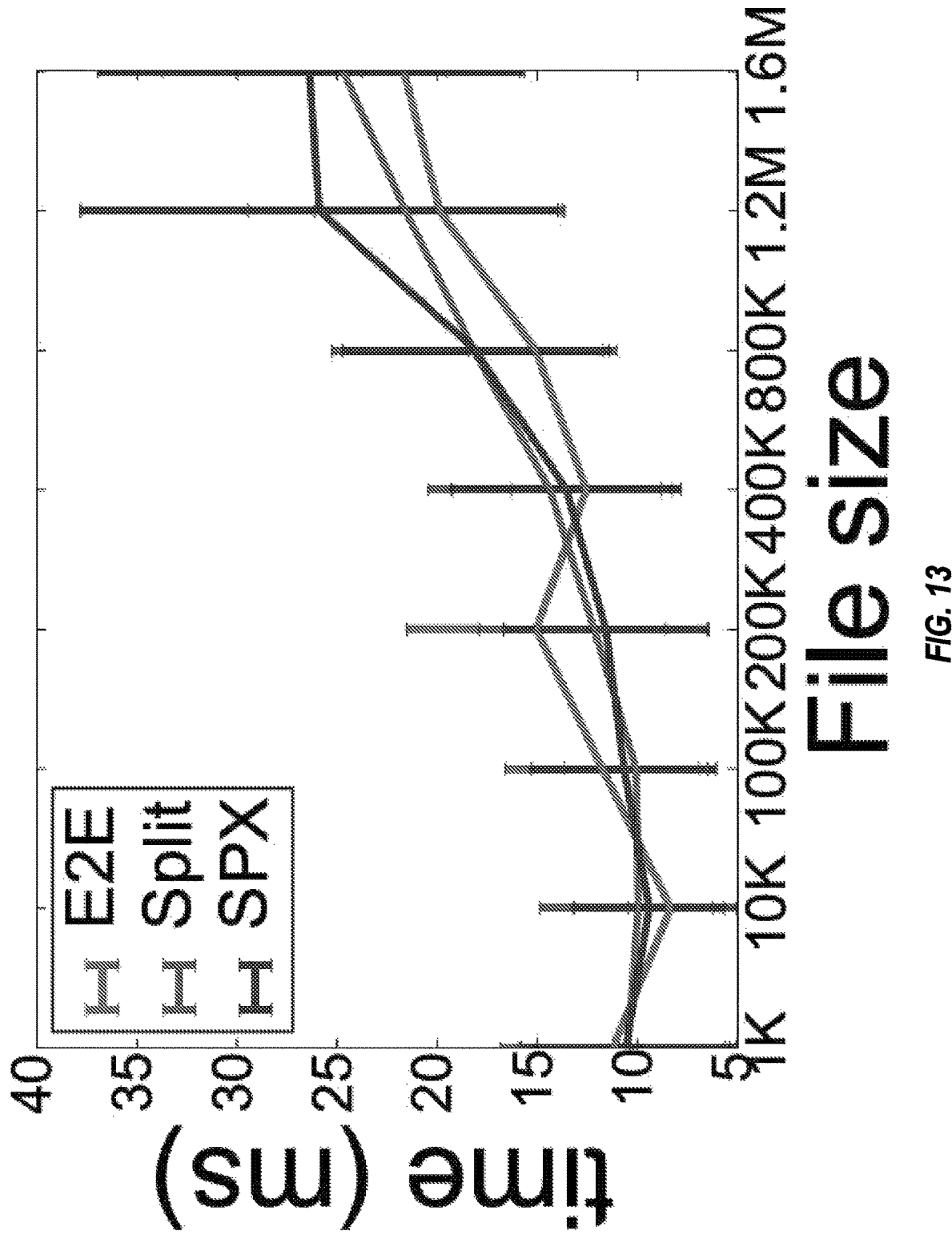
FIG. 13 is a chart depicting file transfer time of SPX enabled TLS, according to an example embodiment.
Figure 14:
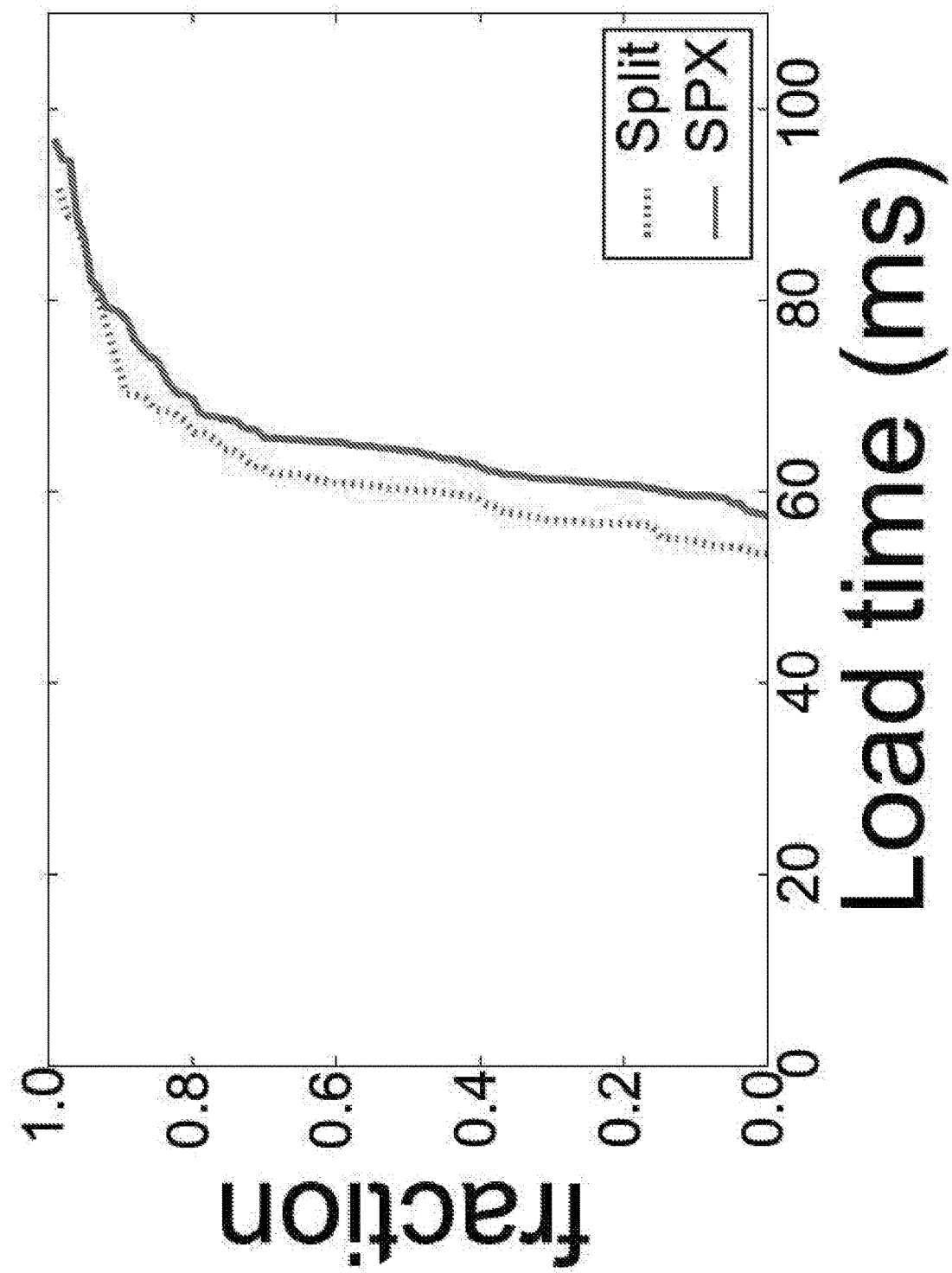
FIG. 14 is a chart depicting the CDF of a locally replayed web page load time of SPX enabled TLS, according to an example embodiment.

The graph in FIG. 13 shows time measured on the client side in file transfer using TLX over TCP. FIG. 13 shows that SPX, as disclosed herein, and as shown in FIG. 8, incurs a modest overhead of 12-15%, demonstrating that SPX is a low-overhead solution that provides full secure access under end-to-end security properties. The graph in FIG. 14 shows the cumulative distribution function of locally replayed web page load times for Alexa's top-100 web pages over TLX. FIG. 14 shows that there is modest SPX overhead in full web page loading, demonstrating that SPX is a low-overhead solution that provides full secure access under end-to-end security.

Figure 15:
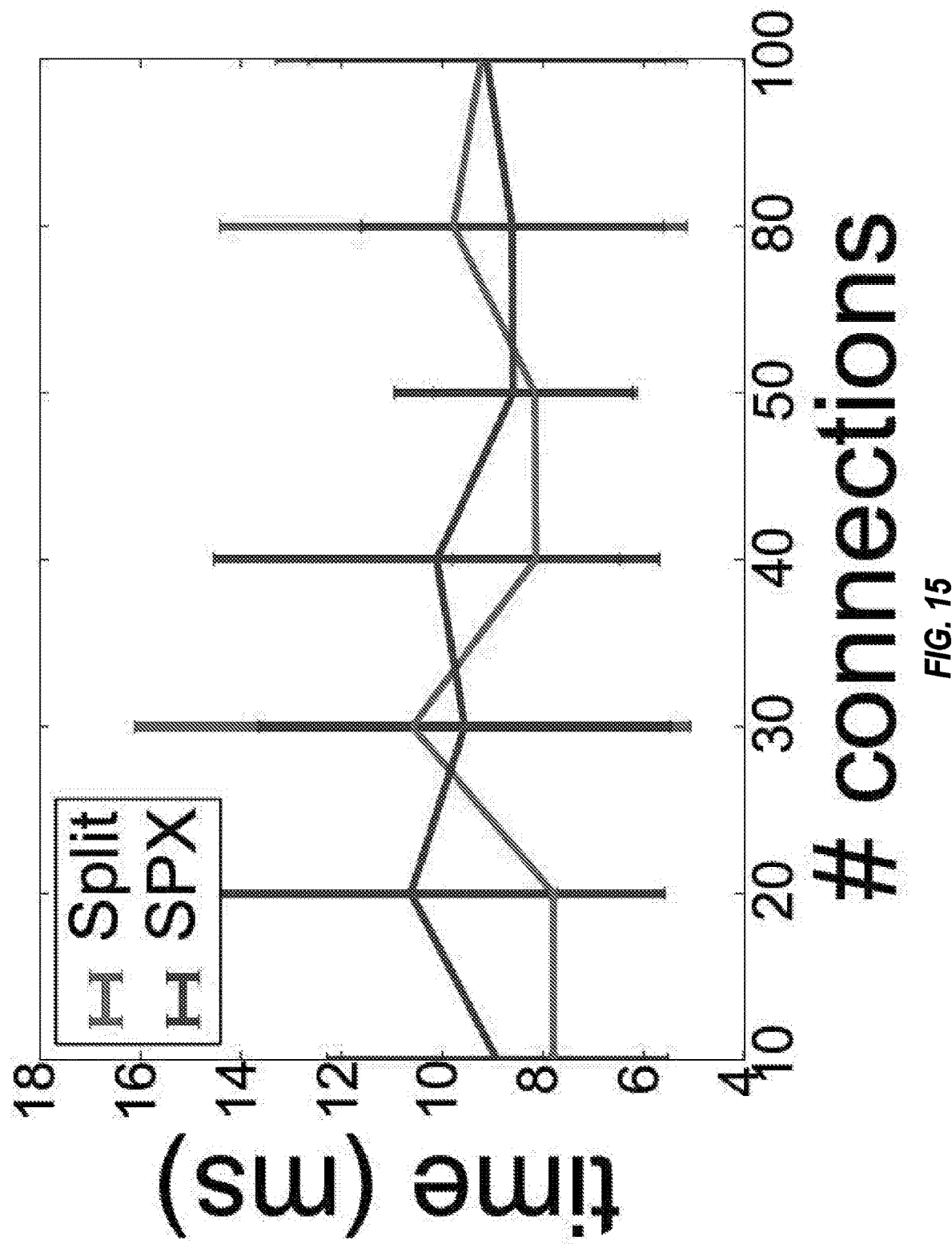
FIG. 15 is a chart depicting variation of time measured in file transfer using SPX enabled TLS with numbers of concurrent connections, according to an example embodiment.
Figure 16:
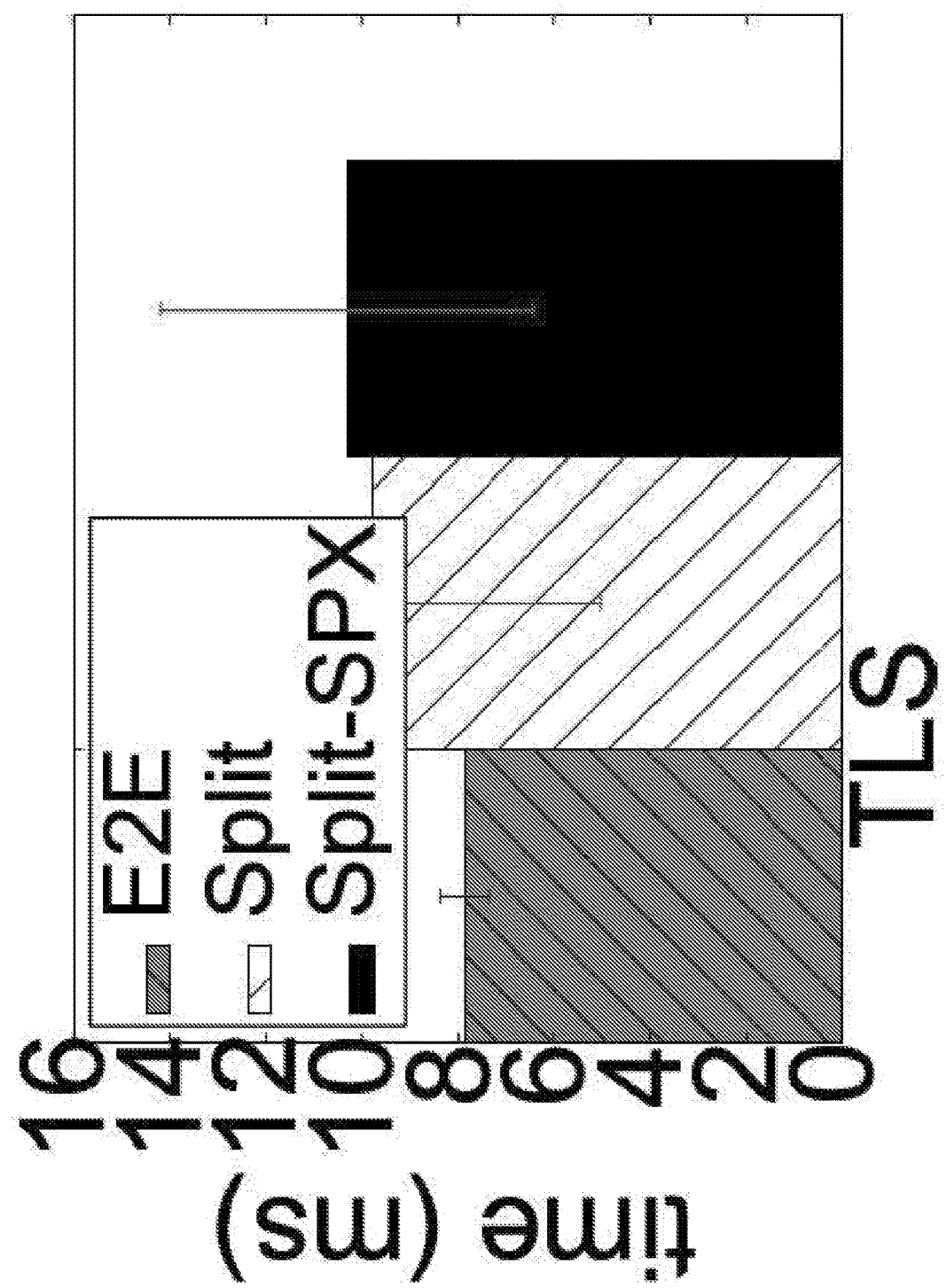
FIG. 16 is a chart depicting the handshake time of SPX enabled TLS, according to an example embodiment.

The graph in FIG. 15 shows variation of time measured in file transfer using TLS with a number of concurrent connections. FIG. 15 shows that SPX performance is not constrained by the number of concurrent connections, demonstrating that SPX, as disclosed herein, and as shown in FIG. 8, is a good candidate to serve multiple clients on the edge infrastructure. The graph in FIG. 16 shows a comparison of handshake times for SPX enabled TLS protocol as observed on the client side. FIG. 16 shows that there is an overhead of only 12-15% over the baseline, demonstrating that SPX is a low overhead solution that provides full secure access under end-to-end security properties.

Figure 17A:
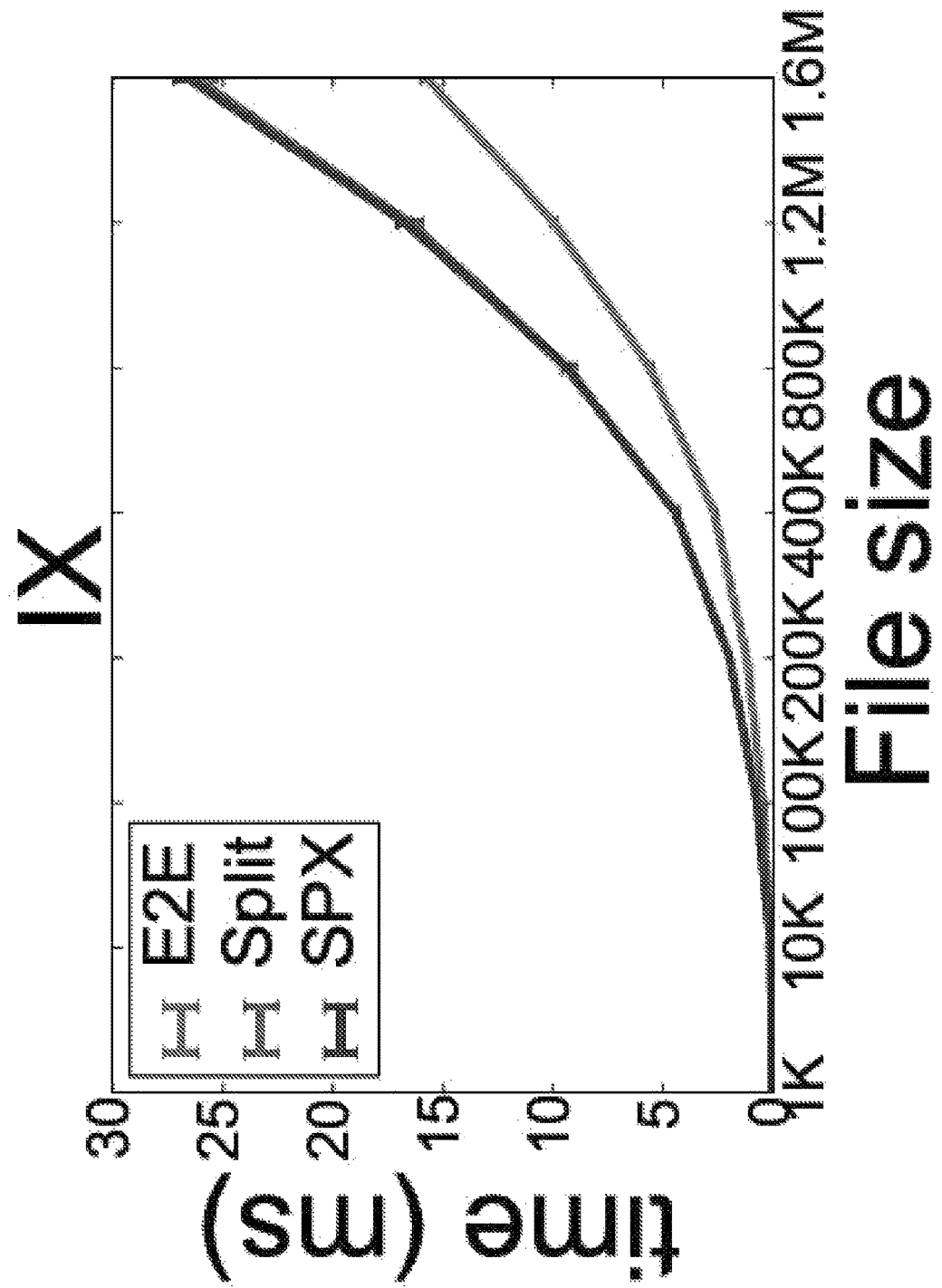
FIGS. 17A-17F are charts depicting the file transfer time of SPX enabled Noise framework, according to an example embodiment.
Figure 17B:
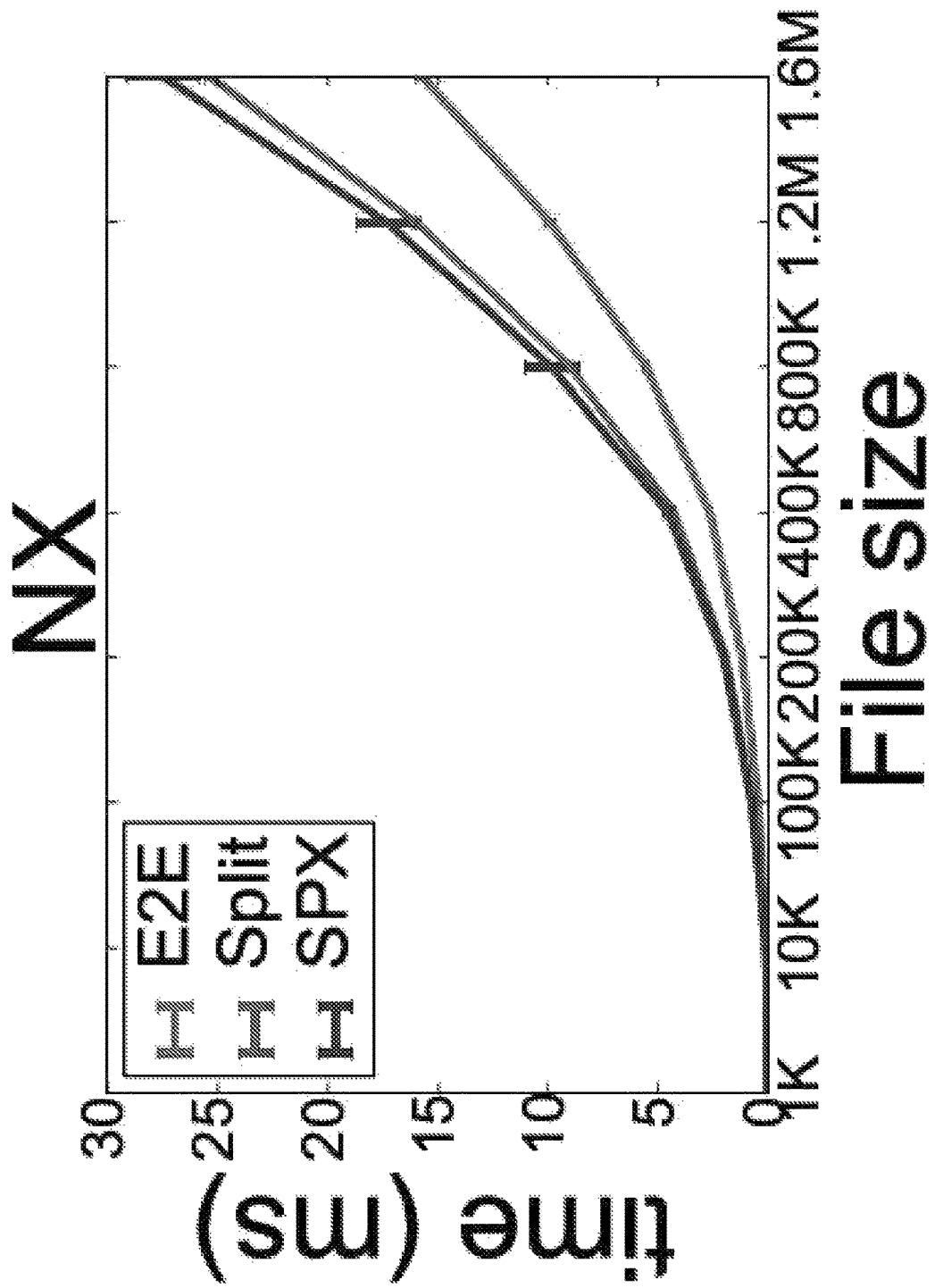
Figure 17C:
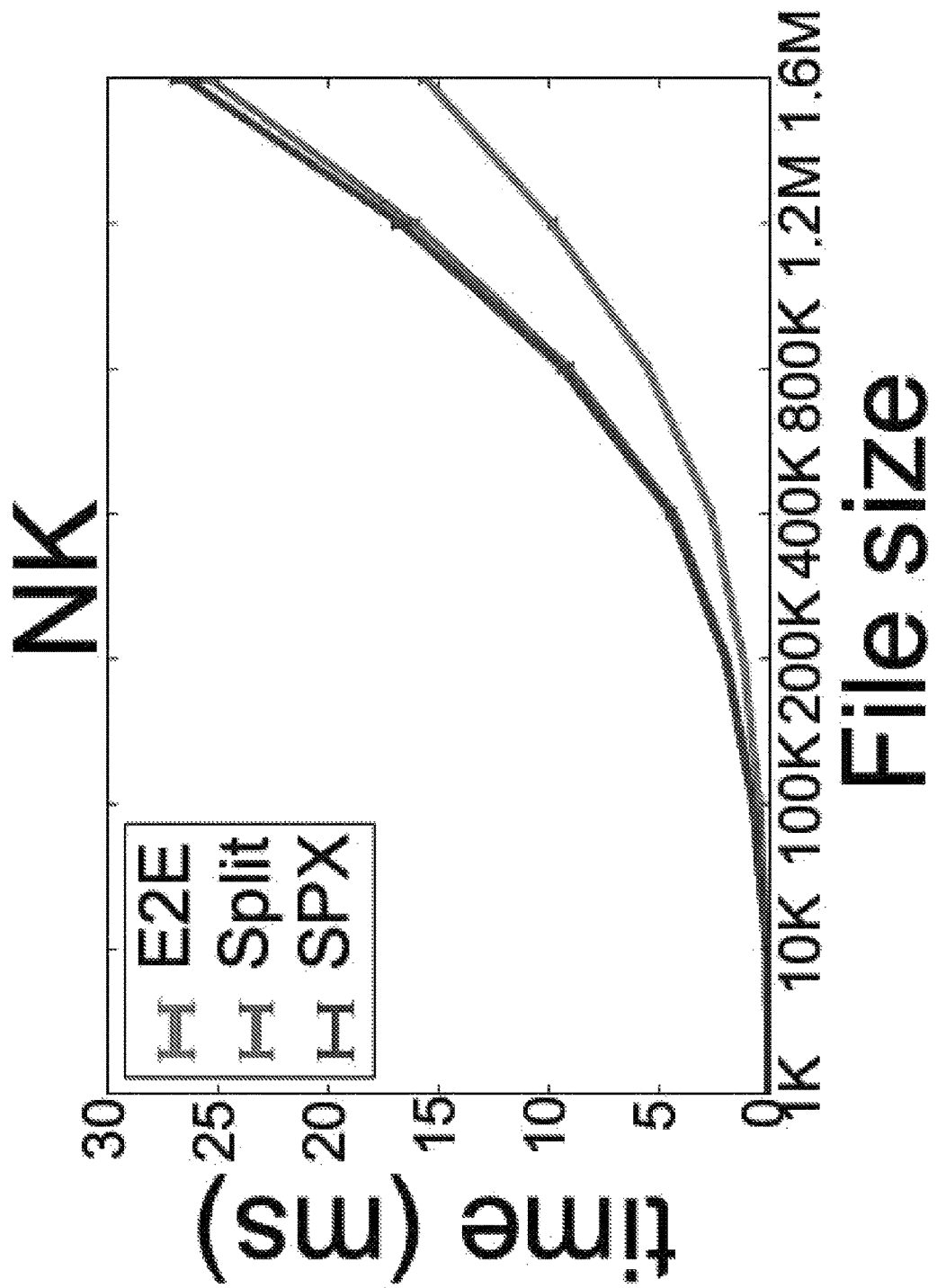
Figure 17D:
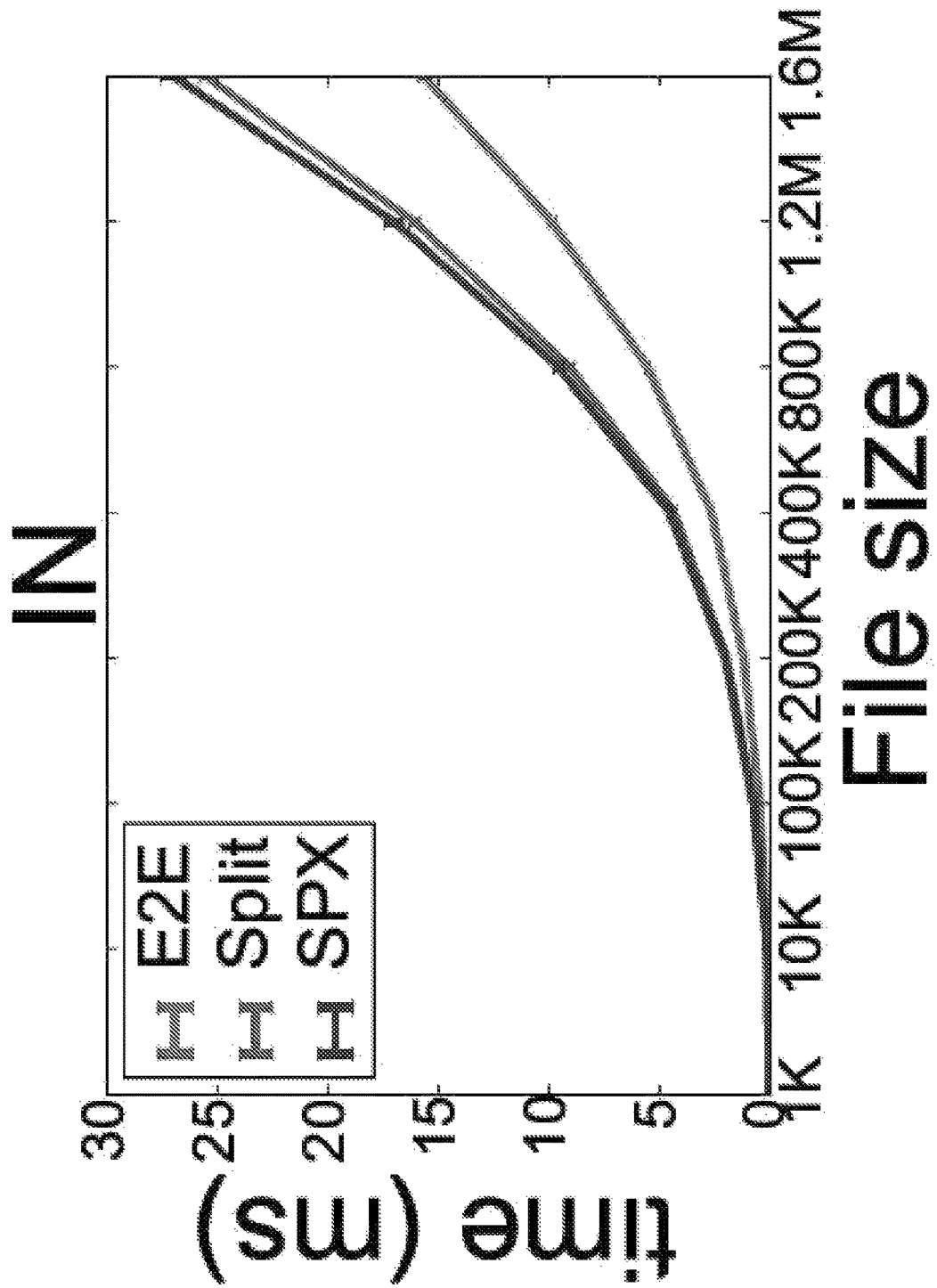
Figure 17E:
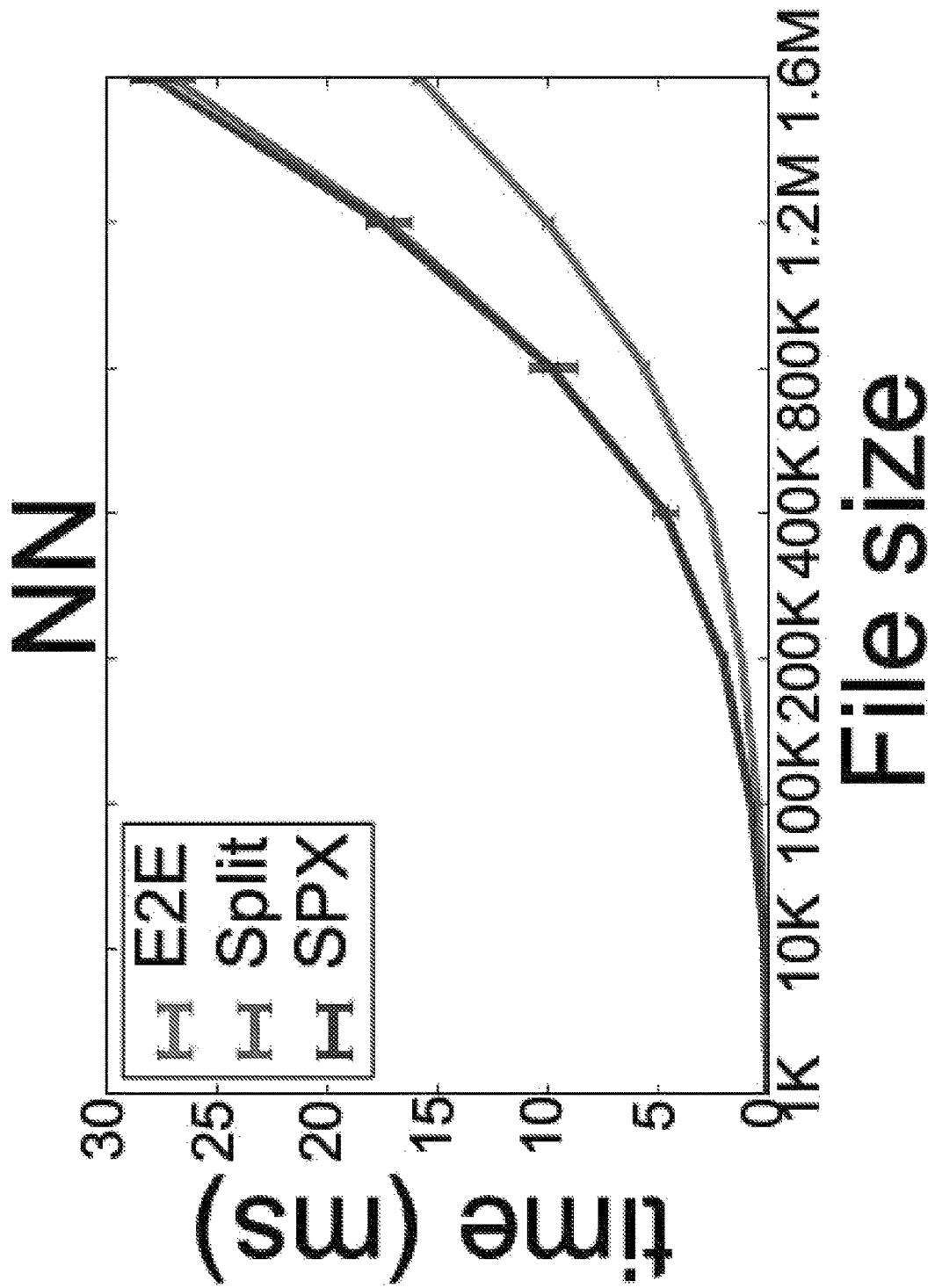
Figure 17F:
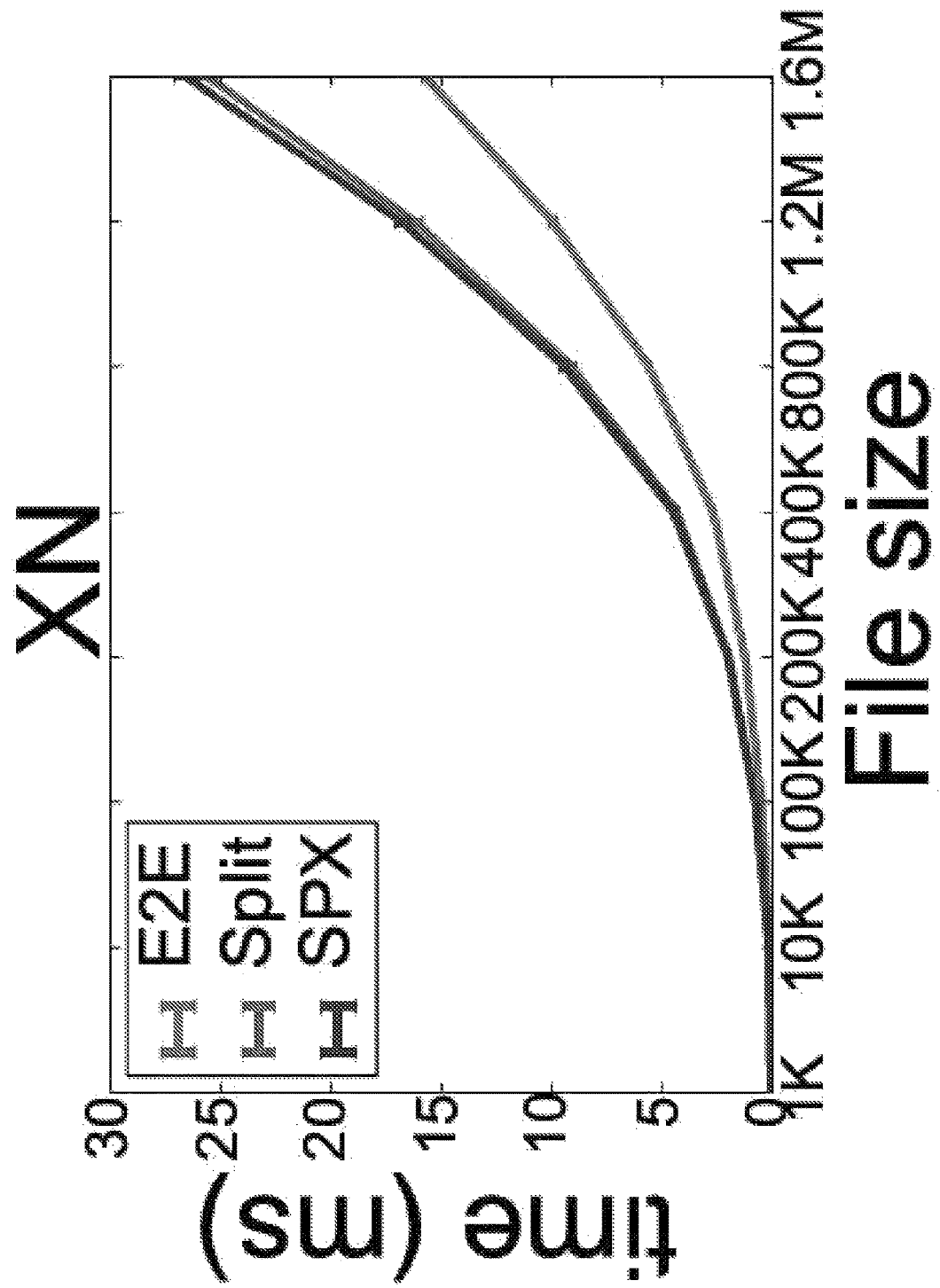
Figure 18:
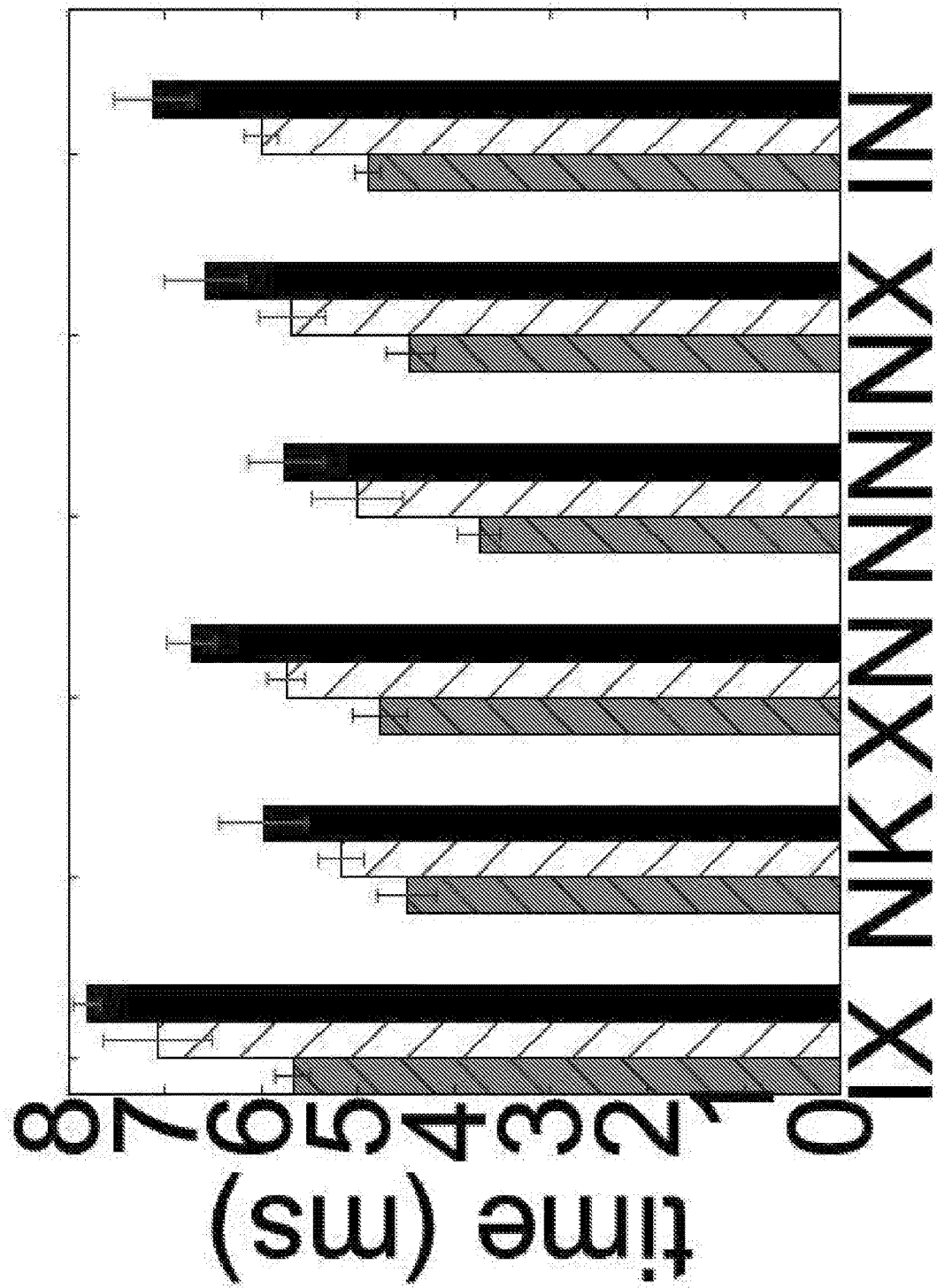
FIG. 18 is a chart depicting the handshake time of an SPX-enabled Noise framework, according to an example embodiment.

An example design employing an SPX-enabled TLS as shown in FIG. 9 on a test system comprising a client, edge, and server machines with 6$^{th}$ generation Intel processors with SGX support. Simulations were performed using echo protocol over TCP socket connection. FIG. 17A-18 show the results of the simulations of the example design compared to the results through traditional end-to-end encryption schemes employing only a client and a server.

The graphs in FIG. 17A-17F show time measured on client side in file transfer using different handshake patterns provided by SPX enabled Noise framework using echo protocol over TCP. FIG. 17A-17F show that there is an overhead of only 12-15% over the baseline, demonstrating that SPX is a low-overhead solution that provides full secure access under end-to-end security properties. The graph in FIG. 18 shows a comparison of handshake times for SPX-enabled Noise protocol as observed on the client side. FIG. 18 shows that there is an overhead of only 12-15% over the baseline, demonstrating that SPX is a low-overhead solution that provides full secure access under end-to-end security properties.

Figure 19:
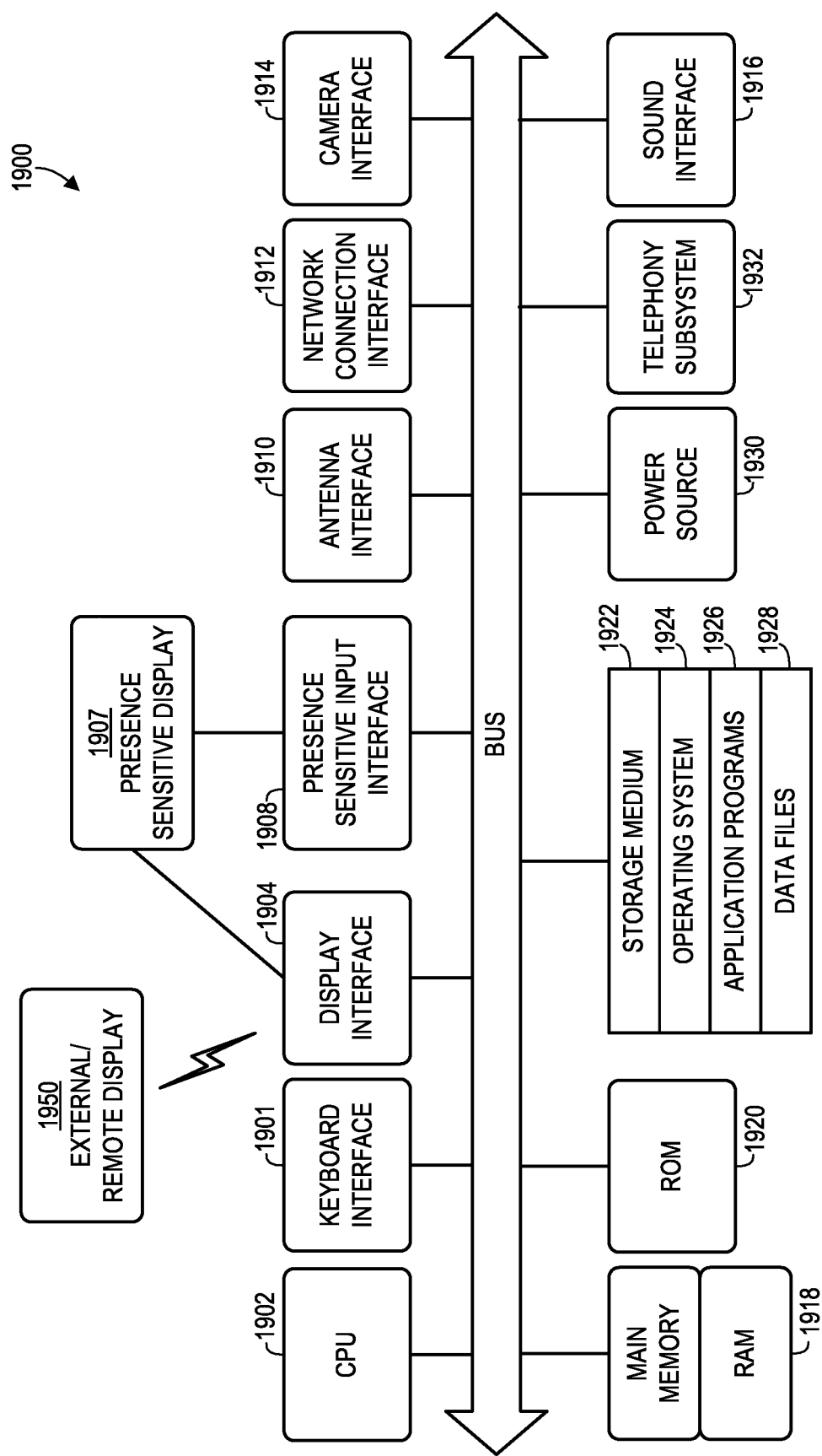
FIG. 19 is a block diagram of an illustrative computer system architecture, according to an example implementation.

Aspects of the disclosed technology may be implementing using at least some of the components illustrated in the computing device architecture 1900 of FIG. 19. As shown, the computing device architecture includes a central processing unit (CPU) 1902, where computer instructions are processed; a display interface 1904 that acts as a communication interface and provides functions for rendering video, graphics, images, and texts on the display. In certain example implementations of the disclosed technology, the display interface 1904 may be directly connected to a local display, such as a touch-screen display associated with a mobile computing device. In another example implementation, the display interface 1904 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 1904 may wirelessly communicate, for example, via a Wi-Fi channel or other available network connection interface 1912 to the external/remote display.

In an example implementation, the network connection interface 1912 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1904 may be operatively coupled to a local display, such as a touch-screen display associated with a mobile device. In another example, the display interface 1904 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 1904 may wirelessly communicate, for example, via the network connection interface 1912 such as a Wi-Fi transceiver to the external/remote display.

The computing device architecture 1900 may include a keyboard interface 1906 that provides a communication interface to a keyboard. In one example implementation, the computing device architecture 1900 may include a presence-sensitive display interface 1908 for connecting to a presence-sensitive display 1907. According to certain example implementations of the disclosed technology, the presence-sensitive display interface 1908 may provide a communication interface to various devices such as a pointing device, a touch screen, a depth camera, etc. which may or may not be associated with a display.

The computing device architecture 1900 may be configured to use an input device via one or more of input/output interfaces (for example, the keyboard interface 1906, the display interface 1904, the presence sensitive display interface 1908, network connection interface 1912, camera interface 1914, sound interface 1916, etc.) to allow a user to capture information into the computing device architecture 1900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1900 or may be a separate device. For example, the input device may be an accelerometer, a magnetometer, a digital camera, a microphone, and an optical sensor.

Example implementations of the computing device architecture 1900 may include an antenna interface 1910 that provides a communication interface to an antenna; a network connection interface 1912 that provides a communication interface to a network. As mentioned above, the display interface 1904 may be in communication with the network connection interface 1912, for example, to provide information for display on a remote display that is not directly connected or attached to the system. In certain implementations, a camera interface 1914 is provided that acts as a communication interface and provides functions for capturing digital images from a camera. In certain implementations, a sound interface 1916 is provided as a communication interface for converting sound into electrical signals using a microphone and for converting electrical signals into sound using a speaker. According to example implementations, a random access memory (RAM) 1918 is provided, where computer instructions and data may be stored in a volatile memory device for processing by the CPU 1902.

According to an example implementation, the computing device architecture 1900 includes a read-only memory (ROM) 1920 where invariant low-level system code or data for basic system functions such as basic input and output (I/O), startup, or reception of keystrokes from a keyboard are stored in a non-volatile memory device. According to an example implementation, the computing device architecture 1900 includes a storage medium 1922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1924, application programs 1926 (including, for example, a web browser application, a widget or gadget engine, and or other applications, as necessary) and data files 1928 are stored. According to an example implementation, the computing device architecture 1900 includes a power source 1930 that provides an appropriate alternating current (AC) or direct current (DC) to power components.

According to an example implementation, the computing device architecture 1900 includes and a telephony subsystem 1932 that allows the device 1900 to transmit and receive sound over a telephone network. The constituent devices and the CPU 1902 communicate with each other over a bus 1934.

According to an example implementation, the CPU 1902 has appropriate structure to be a computer processor. In one arrangement, the CPU 1902 may include more than one processing unit. The RAM 1918 interfaces with the computer bus 1934 to provide quick RAM storage to the CPU 1902 during the execution of software programs such as the operating system application programs, and device drivers. More specifically, the CPU 1902 loads computer-executable process steps from the storage medium 1922 or other media into a field of the RAM 1918 in order to execute software programs. Data may be stored in the RAM 1918, where the data may be accessed by the computer CPU 1902 during execution. In one example configuration, the device architecture 1900 includes at least 128 MB of RAM, and 256 MB of flash memory.

The storage medium 1922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1922, which may comprise a machine-readable storage medium.

According to one example implementation, the term computing device, as used herein, may be a CPU, or conceptualized as a CPU (for example, the CPU 1902 of FIG. 19). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for providing a secure mobile edge-computing eco-system comprising:
performing remote attestation by transmitting, to a console, verification, wherein the verification comprises an identity of an edge function and proof that the edge function has not been tampered with, wherein proof that the edge function has not been tampered with is a predetermined portion of logic;
encrypting, by a trusted part of the edge function, at least a portion of logic and data associated with functionality to be provided by the edge function, at least a portion of the logic and data associated with functionality to be provided by the edge function comprising logic and data to be kept secure from an edge device, wherein the trusted part of the edge function is a hardware enabled trusted execution environment;
transmitting, from the trusted part of the edge function and to an untrusted part of the edge function, at least a portion of the logic and data associated with functionality to be provided by the edge function, wherein the untrusted part of the edge function processes input and output requests with the edge device;
writing, by the untrusted part of the edge function and to a memory associated with the edge device, at least a portion of the logic and data associated with functionality to be provide by the edge function;
responsive to receipt of a request at the edge function, establishing, by the edge function, an OS-agnostic secure communication channel between the edge function and a backend server, wherein establishing an OS-agnostic secure communication channel between the edge function and the backend server comprises:
performing remote attestation by transmitting, from the edge function, a request to verify integrity of the backend server and transmitting, to the edge function, verification, wherein the verification comprises the identity of the edge function and proof that the edge function has not been tampered with, wherein proof that the edge function has not been tampered with is a predetermined portion of logic;
transferring from the edge function to the backend server associated with the edge function, a request from a user; and
receiving, by the edge function and from the backend server associated with the edge function, a session key, wherein the session key is received through the OS-agnostic secure communication channel; and
transmitting, to the user, data associated with the user request, wherein transmitting the data associated with the user request comprises:
determining, by the trusted part of the edge function, whether the data associated with the user request is on the edge device;
responsive to determining that the data associated with the user request is on the edge device:
commanding, by the trusted part of the edge function, the untrusted part of the edge function to read the data associated with the user request from the memory associated with the edge device;
reading, by the untrusted part of the edge function, the data associated with the user request from the memory associated with the edge device;
transmitting, from the untrusted part of the edge function and to the trusted part of the edge function, the data associated with the user request;
decrypting, by the untrusted part of the edge device, the data associated with the user request; and
transmitting, by the edge function and to the user, the data associated with the user request; and
responsive to determining that the data is not on the edge device:
forwarding the request for data to the backend server;
receiving, from the backend server and by the edge function, the data associated with the user request; and
transmitting, by the edge function and to the user, the data associated with the user request.

2. The method of claim 1 further comprising:
receiving, at a provisioner of the edge device and from the console, a command to provision the edge function of the edge device, the command comprising the logic and data associated with functionality to be provided by the edge function;

performing remote attestation by receiving, from the console, the request to verify integrity of the edge function;

receiving, at the trusted part of the edge function and from the provisioner, the logic and data associated with functionality to be provided by the edge function;

responsive to receipt, at the edge device and from the user, of the request to access data associated with the edge function, transmitting the request to the edge function, wherein the user is an end client associated with the edge function and the backend server; and opening, by the edge function and to the user, the OS-agnostic secure communication channel.

3. The method of claim 1, wherein the edge function is selected from the group consisting of a cache edge function, a buffering edge function, and an aggregating edge function.

4. The method of claim 1, wherein the console is located on one of the backend server and a third party server.

5. A method for providing a secure mobile edge-computing eco-system comprising:

receiving, at a provisioner of an edge device and from a console, a command to provision an edge function of the edge device, the command comprising logic and data associated with functionality to be provided by the edge function;

performing remote attestation by transmitting, to the console, verification, wherein the verification comprises an identity of the edge function and proof that the edge function has not been tampered with, wherein proof that the edge function has not been tampered with is a predetermined portion of logic;

receiving, at a trusted part of the edge function and from the provisioner, the logic and data associated with functionality to be provided by the edge function;

encrypting, by the trusted part of the edge function, at least a portion of the logic and data associated with functionality to be provided by the edge function;

transmitting, from the trusted part of the edge function and to an untrusted part of the edge function, at least a portion of the logic and data associated with functionality to be provided by the edge function;

writing, by the untrusted part of the edge function and to a memory associated with the edge device, at least a portion of the logic and data associated with functionality to be provide by the edge function;

responsive to receipt, at the edge device and from a user, of a request to access data associated with the edge function, transmitting the request to the edge function;

responsive to receipt of the request at the edge function, establishing, by the edge function, an OS-agnostic secure communication channel between the edge function and a backend server;

opening, by the edge function and to the user, the OS-agnostic secure communication channel; and transmitting, to the user, data associated with the user request.

6. The method of claim 5, wherein at least a portion of the logic and data associated with functionality to be provided by the edge function comprises logic and data to be kept secure from the edge device.

7. The method of claim 5, wherein the trusted part of the edge function is a hardware enabled trusted execution environment.

8. The method of claim 5, wherein the untrusted part of the edge function processes input and output requests with the edge device.

9. The method of claim 5, wherein the user is an end client associated with the edge function and the backend server.

10. The method of claim 5, wherein establishing an OS-agnostic secure communication channel between the edge function and the backend server comprises:

performing remote attestation by transmitting, from the edge function, a request to verify the integrity of the backend server and transmitting, to the edge function, verification;

transferring from the edge function to the backend server associated with the edge function, the request from the user; and receiving, by the edge function and from the backend server associated with the edge function, a session key, wherein the session key is received through the OS-agnostic secure communication channel.

11. The method of claim 5, wherein transmitting the data associated with the user request comprises:

determining, by the trusted part of the edge function, whether the data associated with the user request is on the edge device; and responsive to determining that the data associated with the user request is on the edge device:

commanding, by the trusted part of the edge function, the untrusted part of the edge function to read the data associated with the user request from the memory associated with the edge device;

reading, by the untrusted part of the edge function, the data associated with the user request from the memory associated with the edge device;

transmitting, from the untrusted part of the edge function and to the trusted part of the edge function, the data associated with the user request;

decrypting, by the untrusted part of the edge device, the data associated with the user request; and transmitting, by the edge function and to the user, the data associated with the user request.

12. The method of claim 5, wherein transmitting the data associated with the user request comprises, responsive to determining that the data is not on the edge device:

forwarding the request for data to the backend server;

receiving, from the backend server and by the edge function, the data associated with the user request; and transmitting, by the edge function and to the user, the data associated with the user request.

13. The method of claim 5, wherein the edge function is selected from the group consisting of a cache edge function, a buffering edge function, and an aggregating edge function.

14. The method of claim 5, wherein the console is located on one of the backend server and a third party server.

15. A system comprising a memory operatively coupled to a processor and configured for storing data and instructions that, when executed by the processor, causes the system to:

receive, at a provisioner of an edge device and from a console, a command to provision an edge function of the edge device, the command comprising logic and data associated with functionality to be provided by the edge function;

perform remote attestation by transmitting, to the console, verification, wherein the verification comprises an identity of the edge function and proof that the edge function has not been tampered with, wherein proof that the edge function has not been tampered with is a predetermined portion of logic;

receive, at a trusted part of the edge function and from the provisioner, the logic and data associated with functionality to be provided by the edge function;

encrypt, by the trusted part of the edge function, at least a portion of the logic and data associated with functionality to be provided by the edge function;

transmit, from the trusted part of the edge function and to an untrusted part of the edge function, at least a portion of the logic and data associated with functionality to be provided by the edge function;

write, by the untrusted part of the edge function and to a memory associated with the edge device, at least a portion of the logic and data associated with functionality to be provide by the edge function;

responsive to receipt, at the edge device and from a user, of a request to access data associated with the edge function, transmit the request to the edge function;

responsive to receipt of the request at the edge function, establish, by the edge function, an OS-agnostic secure communication channel between the edge function and a backend server;

open, by the edge function and to the user, the OS-agnostic secure communication channel; and transmit, to the user, data associated with the user request.

16. The system of claim 15, wherein the memory comprises further instructions that, when executed by the processor, causes the system to transmit the data associated with the user request by determining, by the trusted part of the edge function, whether the data associated with the user request is on the edge device, and responsive to a determination that the data associated with the user request is on the edge device:

command, by the trusted part of the edge function, the untrusted part of the edge function to read the data associated with the user request from the memory associated with the edge device;

read, by the untrusted part of the edge function, the data associated with the user request from the memory associated with the edge device;

transmit, from the untrusted part of the edge function and to the trusted part of the edge function, the data associated with the user request;

decrypt, by the untrusted part of the edge device, the data associated with the user request; and transmit, by the edge function and to the user, the data associated with the user request.

17. The system of claim 15, wherein the memory comprises further instructions that, when executed by the processor, causes the system to transmit the data associated with the user request by, responsive to a determination that the data is not on the edge device:

forward the request for data to the backend server;

receive, from the backend server and by the edge function, the data associated with the user request; and transmit, by the edge function and to the user, the data associated with the user request.

18. The system of claim 15, wherein the edge function is selected from the group consisting of a cache edge function, a buffering edge function, and an aggregating edge function.

19. The system of claim 15, wherein the console is located on one of the backend server and a third party server.

20. The system of claim 15, wherein at least a portion of the logic and data associated with functionality to be provided by the edge function comprises logic and data to be kept secure from the edge device;

wherein the trusted part of the edge function is a hardware enabled trusted execution environment;

wherein the untrusted part of the edge function processes input and output requests with the edge device; and wherein the user is an end client associated with the edge function and a backend server.

21. The system of claim 15, wherein the memory comprises further instructions that, when executed by the processor, causes the system to establish, by the edge function, the OS-agnostic secure communication channel between the edge function and the backend server by:

performing remote attestation by transmitting, from the edge function, a request to verify the integrity of the backend server and transmitting, to the edge function, verification;

transferring from the edge function to the backend server associated with the edge function, the request from the user; and receiving, by the edge function and from the backend server associated with the edge function, a session key, wherein the session key is received through the OS-agnostic secure communication channel.

* * * * *